US012461482B2

(12) United States Patent
Hattori

(10) Patent No.: US 12,461,482 B2
(45) **Date of Patent: *Nov. 4, 2025**

(54) OPERATION UNIT AND IMAGE FORMING APPARATUS

(71) Applicant: CANON KABUSHIKI KAISHA, Tokyo (JP)

(72) Inventor: Shingo Hattori, Gunma (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,359

(22) Filed: Nov. 1, 2023

(65) Prior Publication Data

US 2024/0085850 A1 Mar. 14, 2024

Related U.S. Application Data

(63) Continuation of application No. 17/980,733, filed on Nov. 4, 2022, now Pat. No. 11,835,916.

(30) Foreign Application Priority Data

Dec. 9, 2021 (JP) ................................ 2021-199860

(51) Int. Cl.
*G03G 21/16* (2006.01)
*G03G 15/00* (2006.01)

(52) U.S. Cl.
CPC ..... *G03G 21/1652* (2013.01); *G03G 15/5016* (2013.01); *G03G 21/1619* (2013.01)

(58) Field of Classification Search
CPC ........... G03G 21/1652; G03G 21/1619; G03G 15/5016; G03G 21/1647
See application file for complete search history.

(56) References Cited

U.S. PATENT DOCUMENTS 11,835,916 B2 * 12/2023 Hattori ............... G03G 21/1652
2012/0162728 A1 6/2012 Ota et al.
(Continued)

FOREIGN PATENT DOCUMENTS

JP H02116680 U 9/1990
JP H08312231 A 11/1996
(Continued)

OTHER PUBLICATIONS

Notice of Allowance issued in U.S. Appl. No. 17/980,733 mailed Aug. 22, 2023.

*Primary Examiner* — Sandra Brase
(74) *Attorney, Agent, or Firm* — ROSSI, KIMMS & McDOWELL LLP

(57) ABSTRACT

An operation unit for image forming apparatus is disclosed. The operation unit includes: a bearing portion configured to rotatably support a shaft portion; a restricting portion provided at a position different from that of the bearing portion in an axial direction of the shaft portion, a restricting portion being configured such that when a supporting portion is rotated in a first direction from a first angle toward a second angle, the restricting portion restricts a rotation of the supporting portion in the first direction by abutting a mounting portion at a position where the operation unit forms the second angle; and an abutting portion provided on an opposite side of the restricting portion via the bearing portion in the axial direction, the abutting portion being configured to abut on the shaft portion.

7 Claims, 20 Drawing Sheets

(56) References Cited

U.S. PATENT DOCUMENTS

| | | | |
|---|---|---|---|
| 2017/0310838 | A1 | 10/2017 | Saito |
| 2018/0077307 | A1 | 3/2018 | Sawada |
| 2018/0101114 | A1 | 4/2018 | Takeuchi et al. |

FOREIGN PATENT DOCUMENTS

| | | | |
|---|---|---|---|
| JP | 2010243977 | A | 10/2010 |
| JP | 2015178228 | A | 10/2015 |
| JP | 2021148837 | A | 9/2021 |

* cited by examiner

FIG 8A
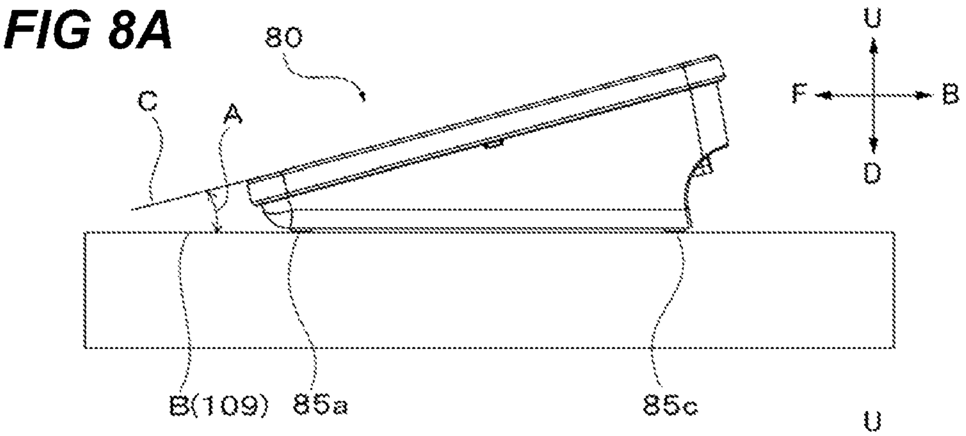
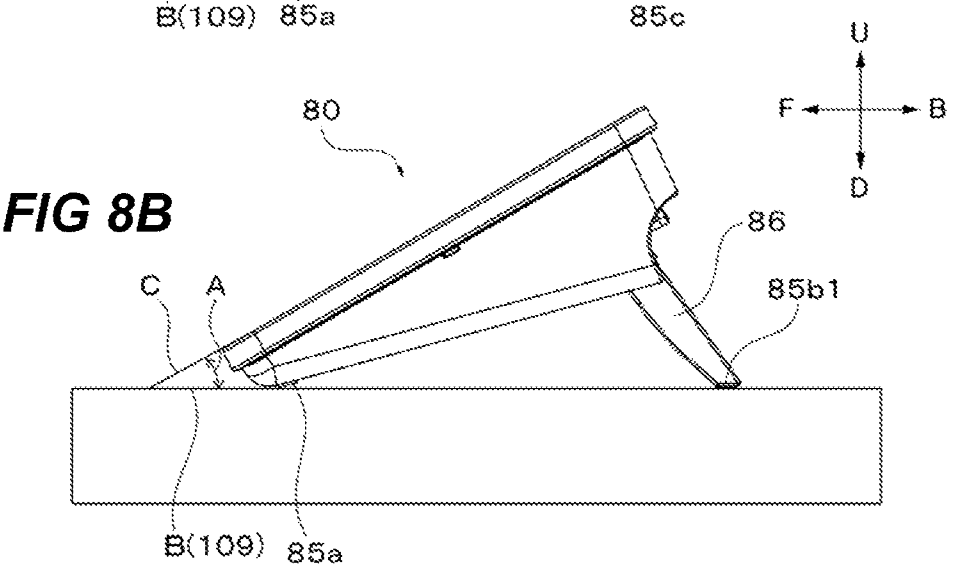
FIG 8B
FIG 8C
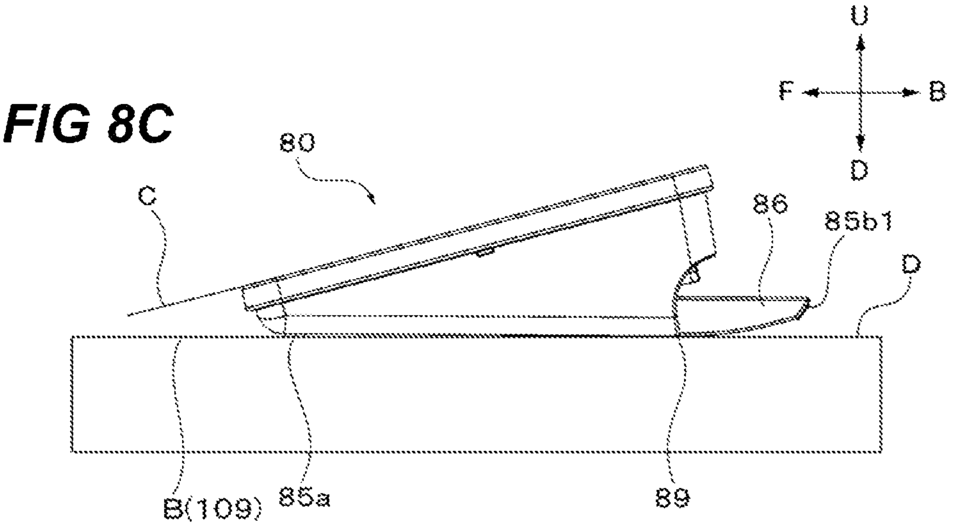

FIG 17A
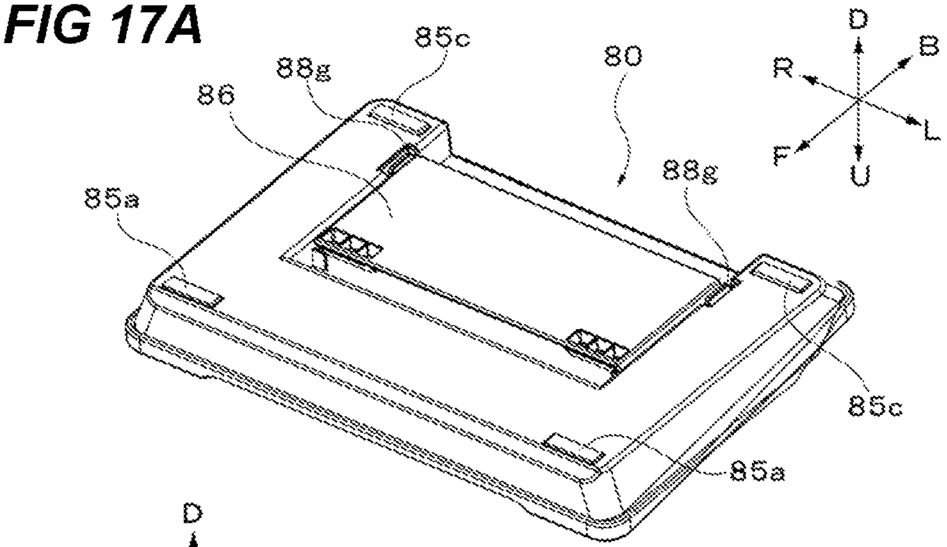
FIG 17B
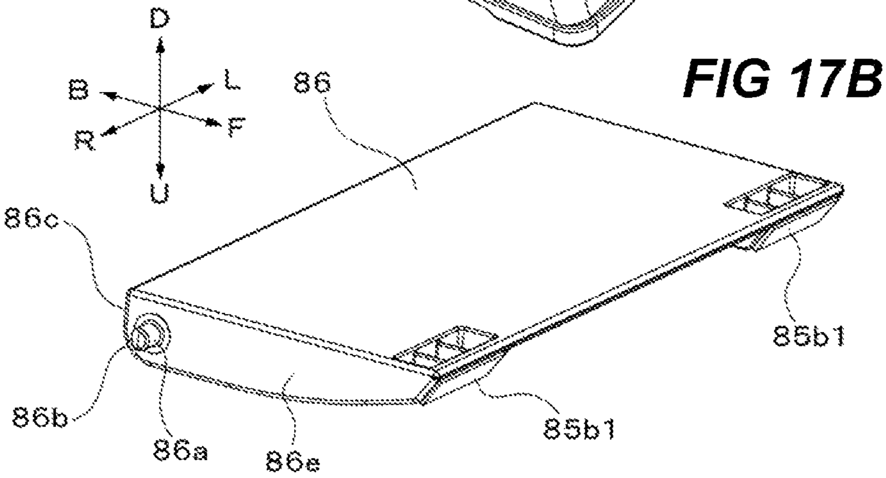
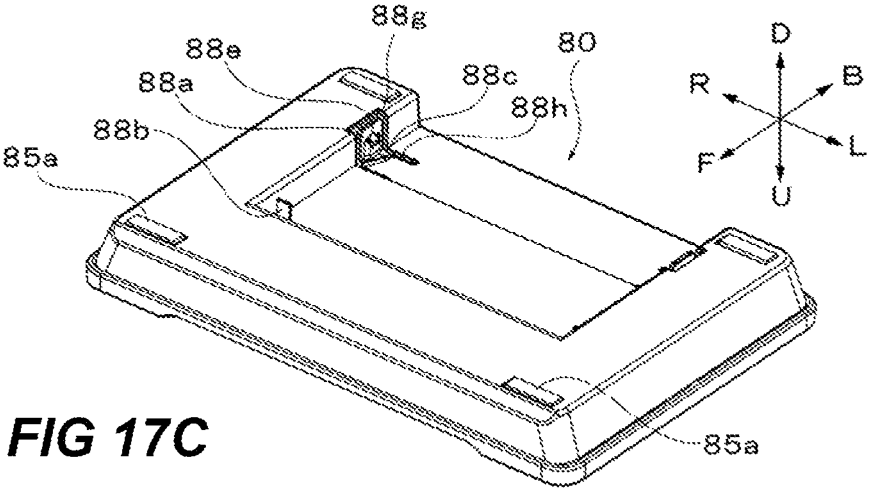
FIG 17C

OPERATION UNIT AND IMAGE FORMING APPARATUS

BACKGROUND OF THE INVENTION

Field of the Invention

This invention relates to an operation unit and an image forming apparatus that includes the operation unit.

Description of the Related Art

An image forming apparatus such as a copying machine has an operation unit for a user to switch operations and to make detailed settings in each operation. In an image forming system in which optional devices such as a feeding unit, a conveying unit and a post-processing unit are connected to the image forming apparatus, a user also performs tasks such as setting various these optional devices using the operation unit.

When a large imaging forming system in which multiple optional devices are connected together so that the overall length of the imaging forming system becomes large, a user may perform tasks on the optional devices at a distant position from the image forming system on which the operation unit is provided. When such tasks are performed frequently, it is not efficient for the user to return to the image forming apparatus to operate the operating unit.

In view of this, Japanese Patent Application Laid-Open No. 2010-243977 proposes a system in which an operation unit is installed not only on the image forming apparatus but also on an optional device. In the apparatus disclosed in this document, the operation unit is connected to the image forming apparatus by a cable and is movably provided at a location on the top surface of the image forming apparatus where a user can easily operate it within the range of the cable length.

A display panel (display) of the operation unit described in this document, on which information is displayed, is fixed to a stand. Therefore, the posture of the display panel cannot be changed to an angle with which a user can easily operate the operation unit, which does not show an excellent operability.

The operating unit could be equipped with a retractable stand that allows the angle of the display panel to be changed. However, with this configuration, the stand could be damaged when an overload exceeding a predetermined load is applied to the display panel of the operation unit when the retractable stand is open.

SUMMARY OF THE INVENTION

A representative configuration of the present invention is an operation unit used for operating an image forming apparatus that forms an image on a sheet, the operation unit comprising:

a display that displays information on image formation; and a supporting portion configured to support the operation unit such that with a display surface of the display forming a first angle with respect to a placement surface on which the operation unit is placed or a second angle that is larger than the first angle, the supporting portion abuts on the placement surface, the supporting portion being provided on the operation unit such that the supporting portion being able to rotate between the first angle and the second angle, wherein the supporting portion includes:

a shaft portion working as a rotational center; and a mounting portion on which the shaft portion is provided such that the shaft portion protrudes from the mounting portion, the mounting portion being configured to be able to be elastically deformed by an overload exceeding a predetermined load, wherein the operation unit includes:

a bearing portion configured to rotatably support the shaft portion;

a restricting portion provided at a position different from that of the bearing portion in an axial direction of the shaft portion, the restricting portion being configured such that when the supporting portion is rotated in a first direction from the first angle toward the second angle, the restricting portion restricts a rotation of the supporting portion in the first direction by abutting the mounting portion at a position where the display surface forms the second angle with respect to the placement surface; and an abutting portion provided on an opposite side of the restricting portion via the bearing portion in the axial direction, the abutting portion being configured to abut on the shaft portion, and wherein when a rotational force in the first direction by the overload is applied to the supporting portion that is restricted to the position where the display surface forms the second angle, the mounting portion is elastically deformed in a direction opposite to a direction in which the shaft portion protrudes in the axial direction to release the abutting between the restricting portion and the mounting portion.

Further features of the present invention will become apparent from the following description of exemplary embodiments with reference to the attached drawings.

BRIEF DESCRIPTION OF THE DRAWINGS

FIGS. 8A, 8B and 8C are diagrams, each showing a side view of the operation unit according to the first embodiment.

FIGS. 17A, 17B and 17C are diagrams, each showing a perspective view of the operation unit according to the third embodiment.

DESCRIPTION OF THE EMBODIMENTS

Hereinafter, embodiments of the present invention will be exemplarily described in detail with reference to the drawings. The dimensions, materials, shapes, and relative positions of components described in the following embodiments should be appropriately changed according to the configuration of the apparatus to which the present invention is applied and various conditions and are not intended to limit the scope of the present invention only to them.

First Embodiment

Figure 1:
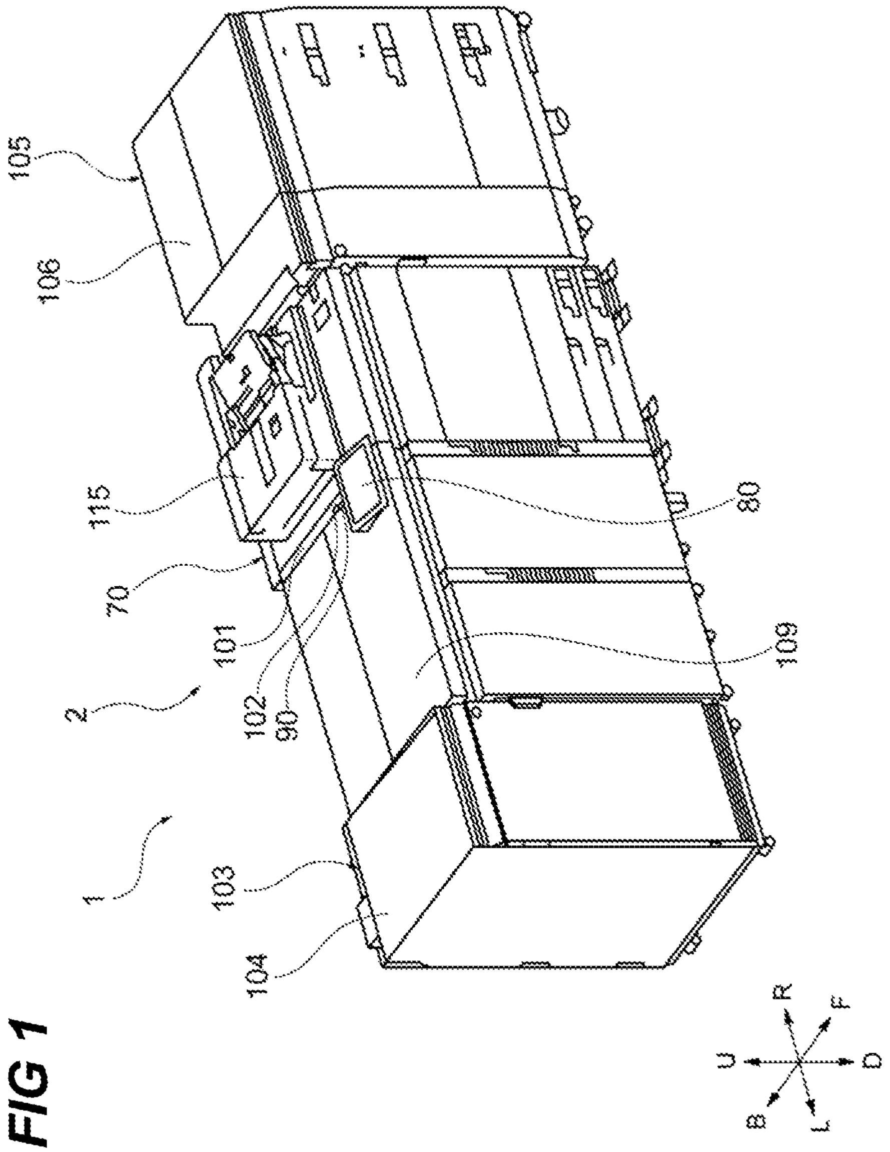
FIG. 1 is a diagram showing a perspective view of an image forming system.
Figure 2:
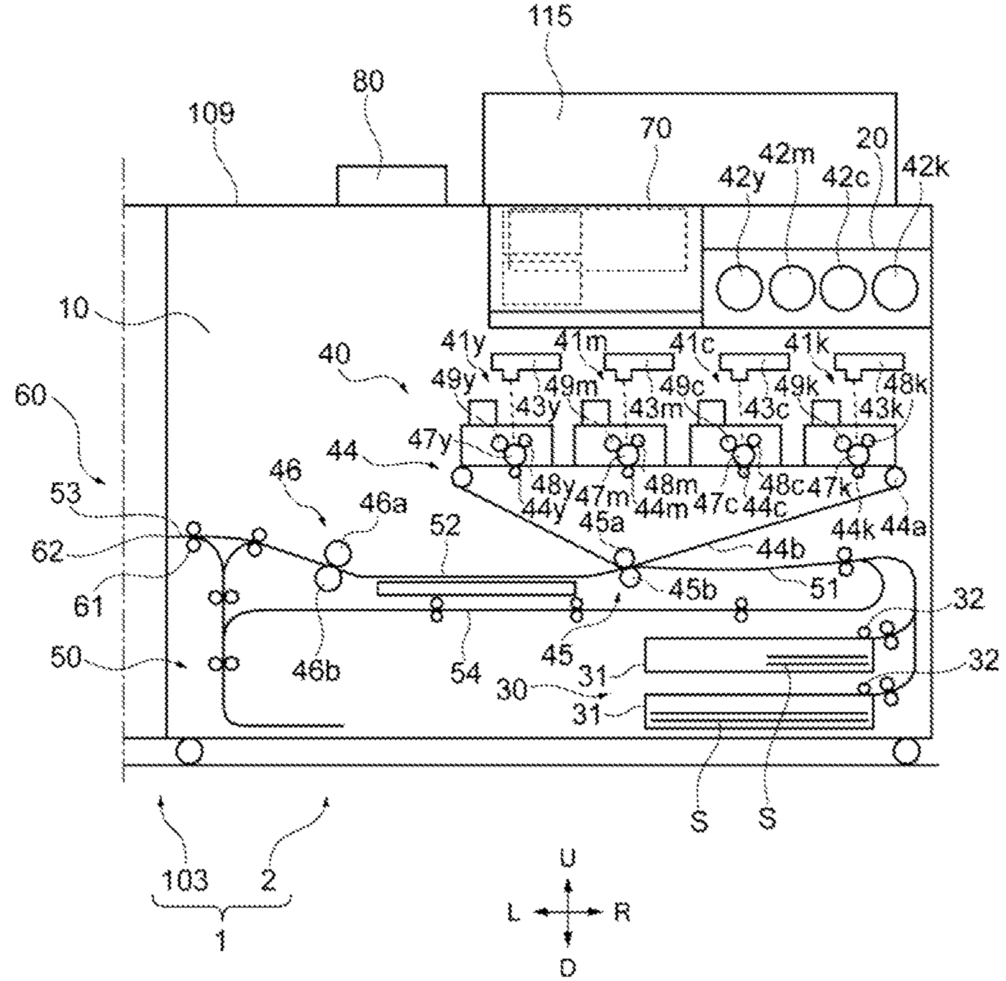
FIG. 2 is a diagram showing a cross-sectional view of the image forming system.

The image forming system 1 according to this embodiment will be described with reference to FIGS. 1 to 4. As shown in FIG. 1, the direction toward the front side from the image forming apparatus 2 is defined as the forward direction F, and the direction toward the back side from the image forming apparatus is defined as the backward direction B. The direction from the image forming apparatus 2 toward the left side where the post-processing device 103 is located is defined as the left direction L, and the direction from the image forming apparatus 2 toward the right side where the feeding device 105 is located is defined as the right direction R. The left and right directions defined here are respectively orthogonal to the forward and backward directions. Furthermore, the vertically upward direction perpendicular to the forward and backward directions and the left and right directions defined here is defined as the upward direction U and the vertically downward direction perpendicular to the forward and backward directions and the left and right directions defined here is defined as the downward direction D. The forward direction F, the backward direction B, the right direction R, the left direction L, the upward direction U, and the downward direction D are also shown in FIG. 2, 4 and so on.

(Configuration of Image Forming Apparatus)

As shown in FIG. 1, the image forming system 1 in this embodiment includes the image forming apparatus 2, which is a printer, for example, and the post-processing device 103, which is located adjacent to the left direction L side of the image forming apparatus 2 and may stack a sheet S on which an image has been formed. The top of the image forming apparatus 2 has the top surface 109 that can be used as a work space. The top surface 109 is wider than the maximum size (for example, A3 size) of the sheet S on which this image forming apparatus 2 can form an image.

Figure 4A:
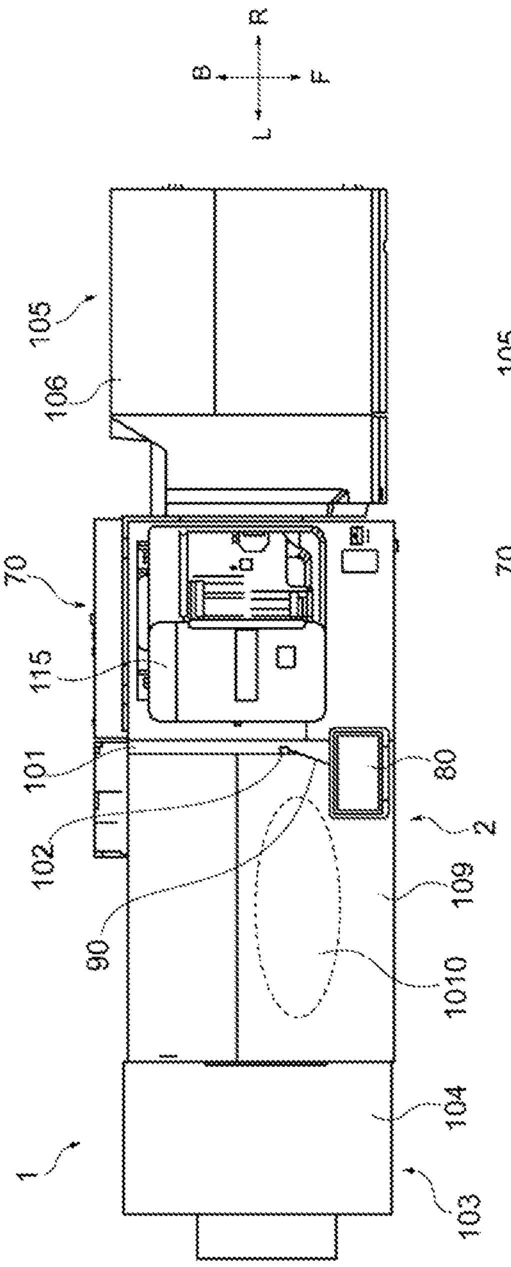
FIGS. 4A and 4B are diagrams showing top views of the image forming system in which the operation unit is arranged.

A user spreads out a drawing on the top surface 109 to perform drafting and other tasks. Therefore, assuming that the floor on which the image forming system 1 is installed is horizontal, the top surface 109 is also configured to be horizontal. Additionally, the top surface 109 is configured as flat as possible. The area indicated by the reference numeral 1010 in FIG. 4A is an example of a work space. If the image forming system 1 is installed horizontally, the work space 1010 will also be horizontal. This area is a part of the top surface 109 and is therefore a flat surface. The term "flat surface" refers to a surface configured such that grooves and other irregularities are minimized except for connection points between components which are unavoidable due to the configuration of the exterior of the image forming system 1. It is sufficient for the work space 1010 to have a flat-surface area enough to spread out an A3 size paper. The top surface 109 is made from a resin plate, for example, and is understood to be a "flat surface" even if it has some degree of rattling or undulation that is unavoidable in manufacturing. Further, the term "horizontal" as used here does not mean horizontal in the strict mathematical sense, but is a concept that includes horizontal to the extent that it can be regarded as horizontal in practice, that is, substantially horizontal.

In this embodiment, a tandem-type full-color printer is described as an example of an image forming apparatus 2. However, the invention is not limited to the image forming apparatus 2 of the tandem-type, but may be an image forming apparatus of another system. Further the invention is not limited to a full color imaging, but may also be monochrome imaging.

As shown in FIG. 2, the image forming apparatus 2 includes the image forming apparatus main body (hereinafter referred to as apparatus main body) 10. The apparatus main body 10 includes the toner supply unit 20, the sheet feeding portion 30, the image forming portion 40, the sheet conveying portion 50, the sheet discharging portion 60, the electrical unit 70, and the operation unit 80. The sheet S as a recording material is the material on which the toner image is formed. Examples of such sheet S include plain paper, a synthetic resin sheet that is a substitute for plain paper, thick paper, and a sheet for an overhead projector.

The sheet feeding portion 30 is located at the bottom of the apparatus main body 10 and is equipped with the sheet cassette 31 that stacks and accommodates the sheets S and the feeding roller 32 that feeds the sheet S to the image forming portion 40.

The image forming portion 40 has the image forming unit 41, the toner bottle 42, the exposure device 43, the intermediate transfer unit 44, the secondary transfer portion 45 and the fixing device 46 to form an image on the sheet S.

The image forming unit 41 has the four image forming units 41*y*, 41*m*, 41*c* and 41*k* to form a toner image in four colors: yellow (y), magenta (m), cyan (c) and black (k). Each of these can be detachably attachable to the apparatus main body 10 by a user. For example, the image forming unit 41*y* has the photosensitive drum 47*y* that forms a toner image, the electrically charged roller 48*y*, the developing sleeve 49*y*, an unshown drum cleaning blade, toner, and so on. Toner is supplied to the image forming unit 41*y* from the toner bottle 42*y* filled with toner. The other image forming units 41*m*, 41*c* and 41*k* have the same configuration as that of the image forming unit 41$y$ except for the use of different toner colors, so a detailed description for the image forming units 41$m$, 41$c$ and 41$k$ is omitted.

The exposure device 43$y$ is an exposure portion that exposes the surface of the photosensitive drum 47$y$ to form an electrostatic latent image on the surface of the photosensitive drum 47$y$.

The intermediate transfer unit 44 is located in the downward direction D of the image forming unit 41. The intermediate transfer unit 44 has a number of rollers such as the drive roller 44$a$ and primary transfer rollers 44$y$, 44$m$, 44$c$ and 44$k$, and the intermediate transfer belt 44$b$ that is wound around these rollers. The primary transfer rollers 44$y$, 44$m$, 44$c$ and 44$k$ are positioned opposite the photosensitive drums 47$y$, 47$m$, 47$c$ and 47$k$, respectively, and abut on the intermediate transfer belt 44$b$. By applying a transfer bias with a positive polarity to the intermediate transfer belt 44$b$ by the primary transfer rollers 44$y$, 44$m$, 44$c$ and 44$k$, toner images with negative polarity on the photosensitive drums 47$y$, 47$m$, 47$c$ and 47$k$ are sequentially and multiply transferred on the intermediate transfer belt 44$b$. As a result, a full-color image is formed on the intermediate transfer belt 44$b$.

The secondary transfer portion 45 has the secondary transfer inner roller 45$a$ and the secondary transfer outer roller 45$b$. By applying a secondary transfer bias with positive polarity to the secondary transfer outer roller 45$b$, the full color image formed on the intermediate transfer belt 44$b$ is transferred to the sheet S. The secondary transfer inner roller 45$a$ is placed inside the intermediate transfer belt 44$b$, and the secondary transfer outer roller 45$b$ is located opposite the secondary transfer inner roller 45$a$ via the intermediate transfer belt 44$b$.

The fixing device 46 has the fixing roller 46$a$ and the pressure roller 46$b$. The toner image transferred to the sheet S is pressurized and heated to fix the image on the sheet S as the sheet S is held and conveyed between the fixing roller 46$a$ and the pressure roller 46$b$.

The sheet conveying portion 50 has the pre-secondary-transfer conveying path 51, the pre-fixing conveying path 52, the discharge path 53 and re-conveying path 54 so that the sheet conveying portion 50 conveys the sheet S fed from the sheet feeding portion 30 from the image forming portion 40 to the sheet discharge portion 60.

The sheet discharge portion 60 has the discharge roller pair 61 located downstream of the discharge path 53 and the discharge port 62 located on the side of the left direction L of the apparatus main body 10. The discharge roller pair 61 feeds the sheet S conveyed from the discharge path 53 from the nip portion and discharges it from the discharge port 62. The discharge port 62 can feed the sheet S to the post-processing device 103 located on the left direction L side of the apparatus main body 10.

Figure 3:
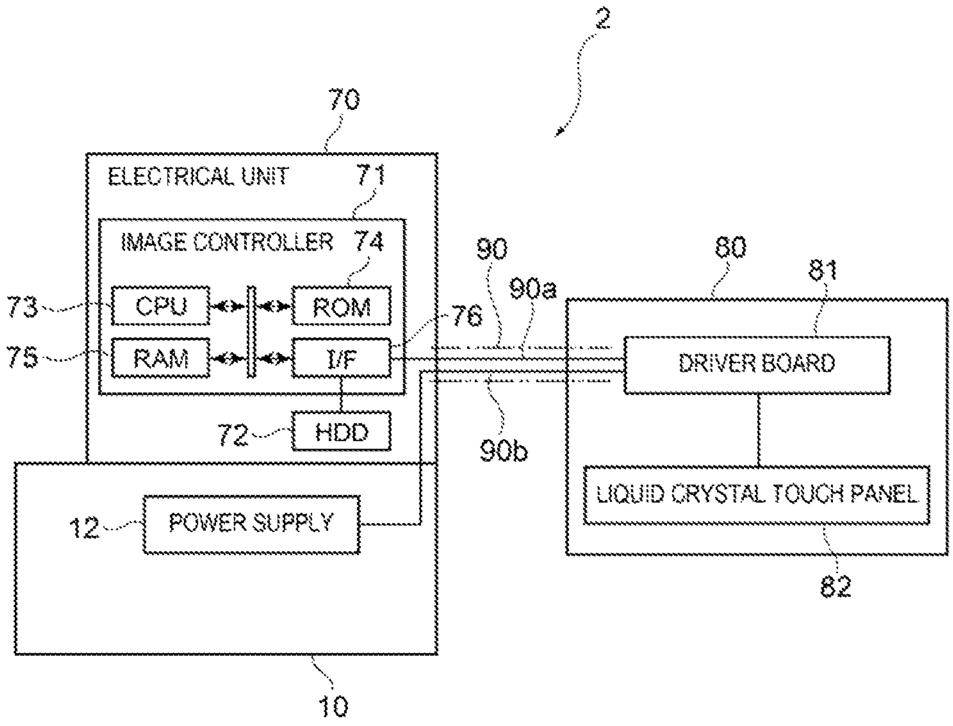
FIG. 3 is a block diagram of the image forming apparatus with an operation unit.

As shown in FIG. 3, the electrical unit 70 has the image controller 71, which is a control board including the control portion, and the hard disk drive (HDD) 72, which is a removable large capacity storage device. The image controller 71 is configured with a computer and has for example the CPU 73, the ROM 74 that stores a program to control each part, the RAM 75 that temporarily stores data, and the input/output circuit (I/F) 76 that inputs and outputs signals to and from the outside. The HDD 72 is a removable large capacity storage device for storing electronic data and stores mainly an image processing program, digital image data and incidental information of digital image data. The image data are read out from the HDD 72 during image forming.

The CPU 73 is a microprocessor that controls the entire image forming apparatus 2 and is the main member of the system controller. The CPU 73 is connected to the sheet feeding portion 30, the image forming portion 40, the sheet conveying portion 50, the sheet discharge portion 60, the HDD 72, and the operation unit 80 via the input/output circuit 76 to exchange signals with each portion and control its operation. A user can operate and set the image controller 71 through commands from an unshown computer connected to the apparatus main body 10 or by operating the operation unit 80.

The operation unit 80 is used for operating the image forming apparatus 2. The operation unit 80 is provided separately from the apparatus main body 10. With the operation unit 80, each portion of the apparatus main body can be operated. The operation unit 80 has the driver board 81 and the display 82 (liquid crystal touch panel). The display 82 is configured to display information (information about image forming) necessary for a user to operate the image forming apparatus 2, such as the remaining amount of the sheets S and toner replenished in the apparatus main body 10, a warning message when the consumables run out, and the procedure for replenishing the consumables. The display 82 is configured to accept an operation input from a user such as data for setting the size and basis weight of the sheet S, adjusting the image density, and setting the number of output sheets. The display 82 of the operation unit 80 in this embodiment is a liquid crystal touch panel. Namely, the display 82 is configured to accept touch operation by a user. Touch operation refers to the operation of touching the display 82 with a fingertip, and is the generic term for operations such as flicking and scrolling.

The operation unit 80 can be energized by being connected to the electrical unit 70 of the apparatus main body 10 with the cable 90. The cable 90 includes the bundle of signal line 90$a$ and the power line 90$b$, but the signal line 90$a$ and the power line 90$b$ may be accommodated in separate cables. The signal line 90$a$ connects the input/output circuit 76 of the image controller 71 with the driver board 81, and the power line 90$b$ connects the power supply 12 of the apparatus main body 10 with the driver board 81.

Next, the image forming operation of the image forming apparatus 2 configured as above will be described using FIG. 2.

When the image forming operation starts, the photosensitive drums 47$y$, 47$m$, 47$c$ and 47$k$ first rotate and their surfaces are charged by the charging rollers 48$y$, 48$m$, 48$c$ and 48$k$. Then, a laser beam is emitted to the photosensitive drums 47$y$, 47$m$, 47$c$ and 47$k$ by the exposure devices 43$y$, 43$m$, 43$c$ and 43$k$ based on image information so that an electrostatic latent image is formed on the surface of the photosensitive drums 47$y$, 47$m$, 47$c$ and 47$k$. When toner adheres to this electrostatic latent image, it is developed and visualized as a toner image, and then is transferred to the intermediate transfer belt 44$b$.

Meanwhile, in parallel with this toner image forming operation, the feed roller 32 rotates to feed the topmost sheet S in the sheet cassette 31 while separating it from the other sheets. The sheet S is then conveyed to the secondary transfer portion 45 via the pre-secondary-transfer conveying path 51, in synchronization with the timing of the toner image on the intermediate transfer belt 44$b$. Next, the image is transferred from the intermediate transfer belt 44$b$ to the sheet S and the sheet S is conveyed to the fixing device 46, where the unfixed toner image is heated and pressurized to fix the image on the surface of the sheet S. Then, the fixed sheet S is discharged from the discharge port 62 by the discharge roller pair 61 and supplied to the post-processing device 103. The fixed sheet S is discharged from the discharge port 62 by the discharge roller pair 61 and supplied to the post-processing device 103.

(Arrangement of Operation Unit)

First, outlines of the electrical unit 70, the operation unit 80, the cable 90, the cover 101, and the opening 102 will be described using FIGS. 4A and 4B.

The electrical unit 70 is provided on the back surface of the apparatus main body 10. A connector (a connecting portion on the apparatus main body side, not shown) provided at one end of the cable 90 is connected to the electrical unit 70. The cable 90 is configured to communicably connect the apparatus main body 10 with the operation unit 80. The other end of cable 90 is provided with a connector (a connecting portion on the operation unit, not shown) and is connected to the operation unit 80. Thus, the operation unit 80 is not secured to the top surface 109 of the image forming apparatus 2, although it is connected to the apparatus main body 10 by the cable 90. The operation unit 80 is provided separately from the apparatus main body 10 and is located movable with respect to the top surface 109. Therefore, a user can freely arrange the operation unit 80 at any position on the top surface 109 as long as the cable 90 reaches. Thus, "freely" here means that the operation unit 80 can be placed at any position on the top surface 109 since the operation unit 80 is not secured to the top surface 109 with for example screws or the like.

In this embodiment, the apparatus main body 10 and the operation unit 80 communicate bidirectionally via the cable 90. Therefore, as mentioned above, the operation unit 80 can be freely repositioned within the length of cable 90.

Figure 4B:
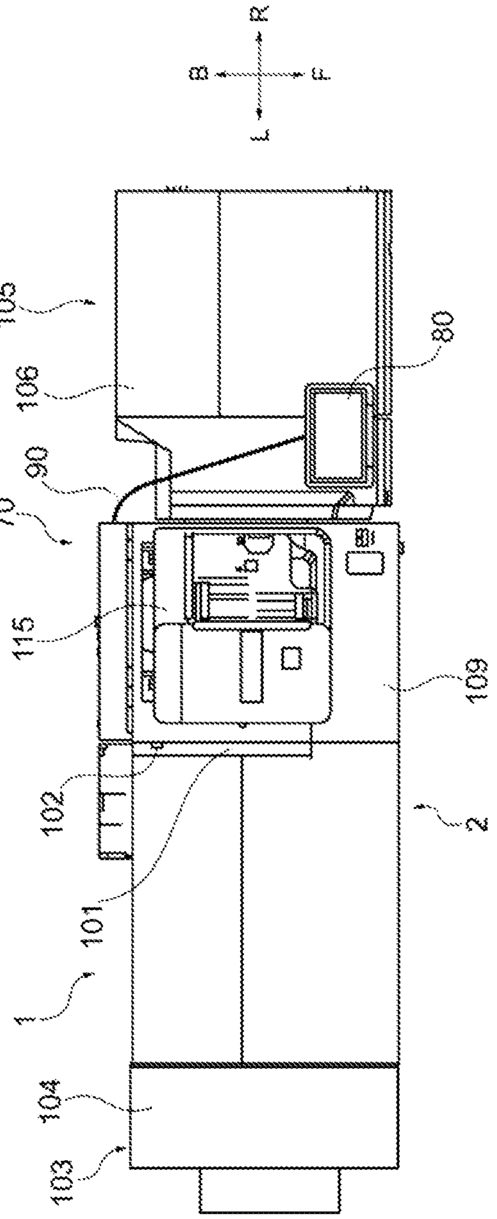

FIGS. 4A and 4B illustrate the positions where the operation unit 80 can be placed on the top surface 109. For example, as shown in FIG. 4A, the operation unit 80 can be placed in the space closer to the document reading device 115 on the top surface of the image forming apparatus 2. Further, as shown in FIG. 4B, the operation unit 80 can be placed in the space on the top surface 106 of the feeding device 105 as well. In addition to the arrangement shown in FIGS. 4A and 4B, the operation unit 80 can be placed on the top surface of the image forming system 1, such as the top surface 104 of the post-processing device 103. In addition to the space on the top surface of the image forming system 1, it is also possible to install a workbench or the like near the image forming system 1 and to place the operation unit 80 on it (not shown).

(Mounting Posture of Cover)

Next, the mounting posture of the cover 101 will be described.

When the operation unit 80 is placed near the document reading device 115 on the top surface 109 of the image forming apparatus 2 and near the front side as shown in FIG. 4A, the cover 101 is mounted in a first mounting posture where the opening 102 on the cover 101 is placed near the front side. The cable 90 connected to the electrical unit 70 by the connector (the connecting portion on the apparatus main body side, not shown) passes under the cover 101 and is connected to the operation unit 80 by the connector (the connecting portion on the operation unit side, not shown) through the opening 102 of the cover 101.

When the operation unit 80 is placed on the top surface 106 of the feeding device 105 as shown in FIG. 4B, the cover 101 is mounted in a second mounting posture where the opening 102 of the cover 101 is placed near the back side of the image forming apparatus 2. The cable 90 connected to the electrical unit 70 by the connector (the connecting portion on the main apparatus body side, not shown) does not pass under the cover 101 and through the opening 102, but passes through an opening (not shown) on the main apparatus body side of the image forming apparatus 2 and is connected to the operation unit 80 by the connector (the connecting portion on the operation unit side, not shown).

The reason for changing the mounting posture of the cover 101 is to restrict the movement of the cable 90 by the passing of the cable 90 through the opening 102 when the operation unit 80 is arranged on the front side as shown in FIG. 4A. As shown in FIG. 4B, in the configuration in which the opening 102 is located on the front side of the apparatus and the cable 90 does not pass through the opening 102, a user may accidentally drop a part into the opening 102, and further, the appearance is bad. In case of the configuration in which the cable 90 does not pass through the opening 102, the opening 102 is placed on the back side of the apparatus instead of locating the opening 102 on the front side of the apparatus, to prevent parts from falling and to improve the appearance of the apparatus.

Similarly, the operation unit 80 not shown in FIGS. 4A and 4B is attached with the cover 101 in either a first mounting posture or a second mounting posture. Further, depending on the arranging position of the operation unit 80, the cable 90 may pass only through the opening 102 without running under the cover 101 when the cover 101 is in the second mounting posture.

(Angle of the Operation Unit)

Figure 5A:
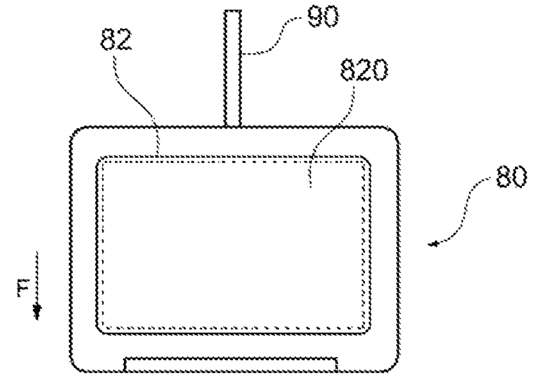
FIGS. 5A, 5B and 5C are diagrams for describing the operation unit.
Figure 5B:
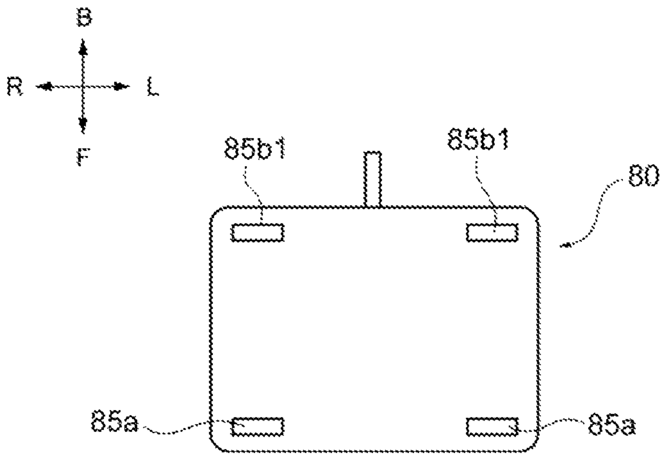
Figure 5C:
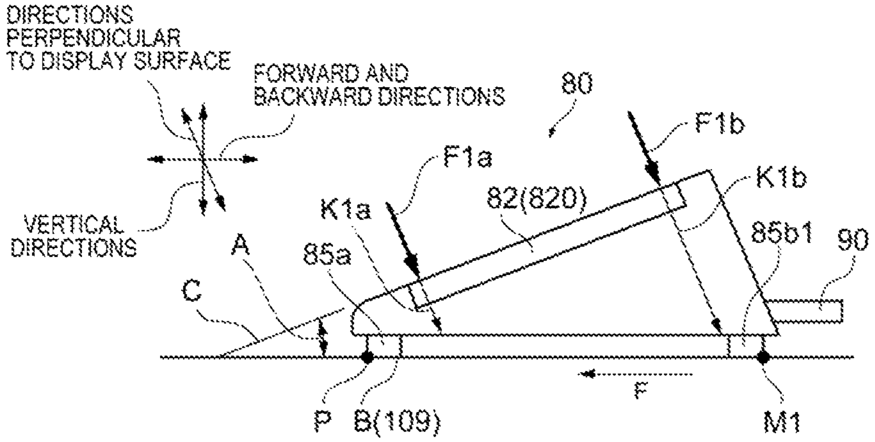

FIG. 5A shows the operation unit 80 viewed from the above along the vertical direction, FIG. 5B shows the operation unit 80 viewed from the bottom, and FIG. 5C is a diagram showing a side view of the operation unit 80.

As shown in FIG. 5A, the operation unit 80 has the display 82. The display 82 of the operation unit 80 in this embodiment is a liquid crystal touch panel. Therefore, the display 82 can accept touch operations by a user. A touch operation is an operation of touching the display 82 with a fingertip, and is a general term for operations such as flicking and scrolling. The cable 90 extends from the back side of the operation unit 80.

Further, as shown in FIG. 5B, the bottom surface of the operation unit 80 is provided with the rubber feet 85 (85*a*, 85*b*1), which are examples of elastic members. The rubber feet 85 (85*a*, 85*b*1) are portions (feet portions) that come into contact with the top surface 109 when the operation unit 80 is arranged on the top surface 109. The rubber feet 85 are made from an elastic member having a surface with a high coefficient of friction. In this embodiment, the front side rubber feet 85*a* are provided at two locations on the front side and the back side rubber feet 85*b*1 are provided at two locations on the backside. Therefore, rubber feet are provided at four locations in total.

As shown in FIG. 5C, when the operation unit 80 is arranged on the top surface 109 which is a placement surface, the surface formed by the rubber feet 85 follows on the top surface 109 is referred to as the rubber feet surface B. The operation unit 80 is a rigid body. Therefore, if the feet portions are also rigid bodies, three of the four feet portions form a flat surface in view of tolerance. Therefore, in the case of four feet portions, when at least two of the feet portions are made of elastic bodies, the feet portions follow the surface on which the feet portions are provided. As a result, a user can stably operate the operation unit 80 on the top surface 109.

The display 82 has the display surface 820 on which information can be displayed which is related to image formation, such as a button for starting copying, a paper size setting screen, a printed sheet count setting screen, a toner remaining amount display screen, and so on. The display surface 820 of the display 82 is the panel surface C for forming an angle of the display 82. In the present embodiment, the display surface 820 is provided on the portion of the display 82 excluding the end portion, but information regarding image formation and screens for print settings may be displayed on the entire surface of the display 82. However, in any case, the inclination angle of the display surface 820 with respect to the top surface 109 is the angle A formed by the vicinity of the center of the display 82 (the area corresponding to the display surface 820 in FIG. 5A) with respect to the top surface 109. In other words, the angle A formed by the operation unit 80 is the angle formed by the rubber foot surface B (the top surface 109) and the panel surface C (display surface 820).

The display 82 has a push range in the front and rear directions. As shown in FIG. 5C, a user operates the display 82 vertically. Therefore, the pressing force F1$a$ on the front side of the apparatus, the pressing force F1$b$ on the back side of the apparatus, the apparatus front side push direction line K1$a$, which extends to the rubber feet 85 in the direction of the pressing force F1$a$, and the apparatus back side push direction line K1$b$, which extends to the rubber feet 85 in the direction of the pressing force F1$b$ are assumed. Further, the front side end portion of the front side rubber feet 85$a$ is referred to as the front side rubber end portion P and the rear side end portion of the rear side rubber feet 85$b$1 is referred to as the back side rubber end portion M1. At this time, the front side rubber end portion P and the back side rubber end portion M1 are arranged so that the apparatus front side push direction line Kia and the apparatus back side push direction line K1$b$ are arranged between the front side rubber end portion P and the back side rubber end portion M1 As a result, even if the display 82 is pressed, the operation unit 80 does not rotate around the front side rubber end portion P or the back side rubber end portion M1, and the back side rubber feet 85$b$1 or the front side rubber feet 85$a$ are not lifted, thereby preventing deterioration of operability.

Further, when the front side rubber end portion P of the operation unit is used as a reference, the back side rubber end portion M1 needs to be arranged on the rear side as the angle A formed by the rubber foot surface B and the panel surface C increases. When the operation unit 80 is based on the front side, it is necessary to increase the size toward the back side. Further, when the front side rubber end portion P of the operation unit is used as a reference, the back side rubber end portion M1 needs to be arranged further to the back side as the angle A formed by the rubber foot surface B and the panel surface C increases. Therefore, the back side of the operation unit 80 needs to be large-sized with the front side being a reference. In particular, when the angle A formed by the operation unit 80 is 45 degrees or more, the enlarging ratio of the back side of the operation unit increases, which makes the operation unit 80 larger, thereby limiting installation locations.

Therefore, in the present embodiment, the upper limit of the angle A formed by the operation unit 80 is set to 45 degrees, and the angle A formed by the operation unit ranges from 0 to 45 degrees. More preferably, the angle A formed by the operation unit 80 is set in the range of 5 to 45 degrees. This ensures good operability without increasing the size of the operation unit.

(Change of Angle of Operation Unit)

Users of various heights touch and operate the operation unit 80. When the height from the floor of the top surface 109 of the image forming apparatus 2 on which the operation unit 80 is placed is limited to a predetermined height (1040 mm), the optimal angle A of the operation unit 80 is obtained as 30 degrees by calculation based on heights of users. However, there are cases where a user who is taller than the expected height or a user who is shorter than the expected height may operate the operation unit 80. Further, some users may prefer an angle A even smaller or larger than 30 degrees.

For such users, the operation unit 80 in this embodiment is configured to adjust the angle A of the operation unit 80 not only to 30 degrees, but also to an angle smaller than 30 degrees (for example, 15 degrees). Such configuration will be described next.

In this embodiment, the angle adjustment mechanism described below is configured such that the panel surface C of the display 82 of the operation unit 80 forms a first angle (15 degrees) or a second angle (30 degrees) greater than the first angle in the range of 0 to 45 degrees to the rubber foot surface B.

Although this embodiment is configured such that the angle A of the operation unit 80 can be adjusted to two different angles, the invention is not limited to this configuration and the angle A can be adjusted to three or more different angles if necessary. Although the first angle is set to 15 degrees and the second angle is set to 30 degrees, but the invention is not limited to these values and the first angle and the second angle can be appropriately set to various values.

Next, the adjustment mechanism for the angle A formed by the operation unit 80 (referred to as the angle adjustment mechanism) will be described using FIGS. 6 to 14.

Figure 6A:
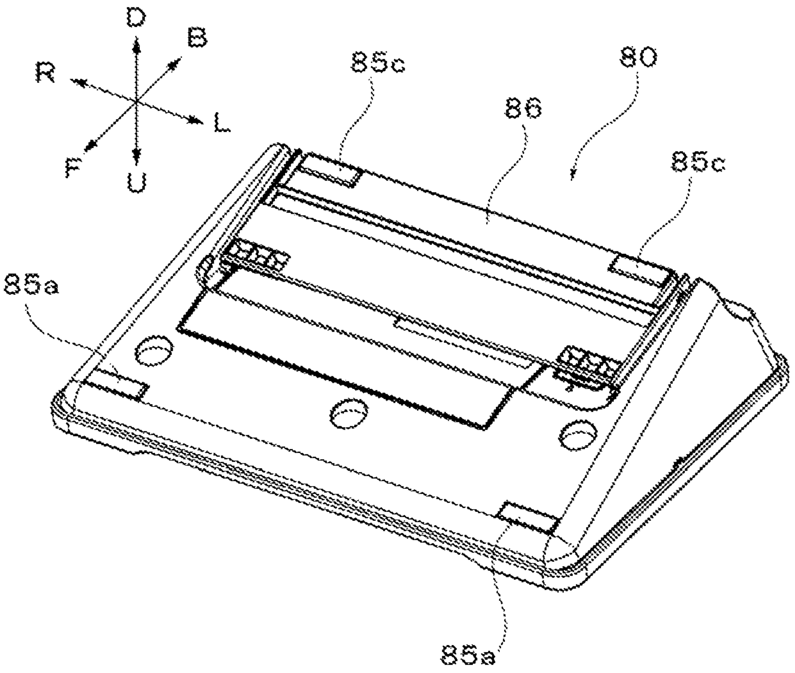
FIGS. 6A and 6B are diagrams, each showing a perspective view of the operation unit according to the first embodiment.
Figure 6B:
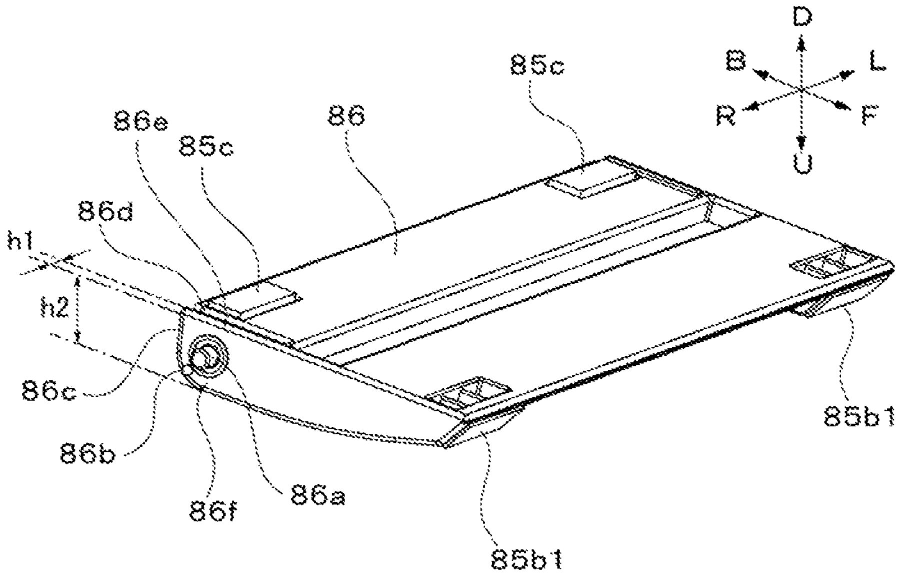
Figure 7A:
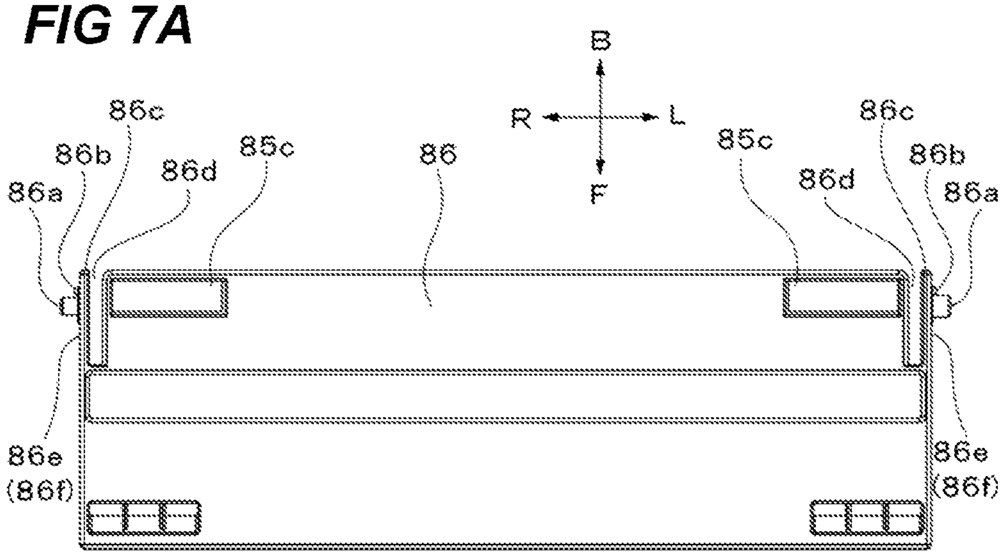
FIGS. 7A and 7B are diagrams, each showing a perspective view of the operation unit according to the first embodiment.
Figure 7B:
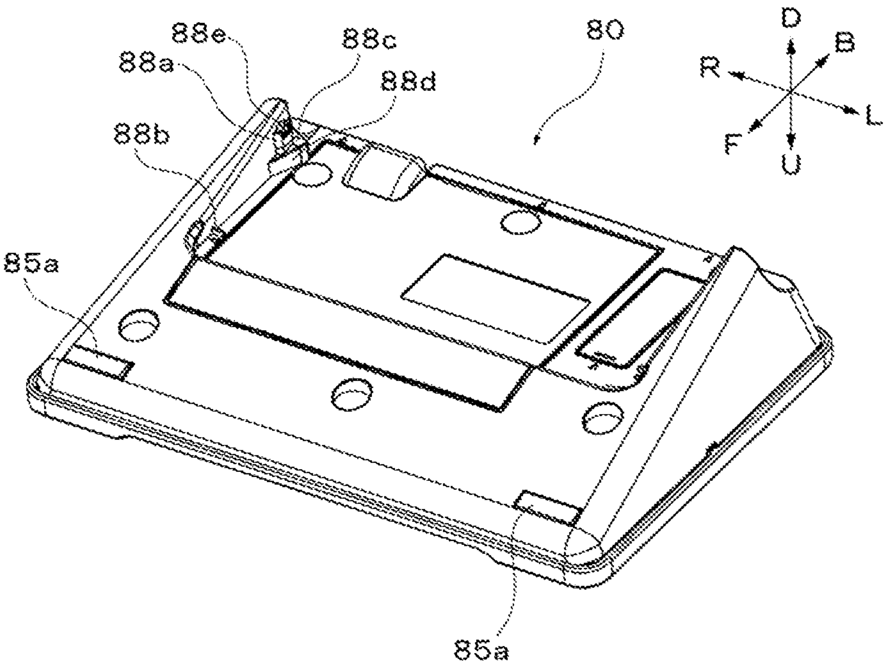

First, the configuration of the angle adjustment mechanism of the operation unit 80 will be described. FIG. 6A is a perspective view of the bottom side of the operation unit 80, FIG. 6B is a perspective view of the leg portion 86 of the operation unit 80, FIG. 7A is a back side view of the leg portion 86, FIG. 7B is a perspective view of the operation unit 80 viewed from bottom surface side with the leg portion 86 being removed.

As the angle adjustment mechanism, the operation unit 80 includes the leg portion 86, the bearing 88$a$, the protruding portion 88$b$, the restricting portion 88$c$, and so on.

The leg portion 86 is rotatably provided on the operation unit 80. The leg portion (support portion) 86 abuts on the top surface 109 and supports the operation unit 80 such that the panel surface C of the display 82 forms a first angle or a second angle larger than the first angle with respect to the top surface 109 (rubber feet surface B) of the image forming apparatus, which is a placement surface.

FIG. 8A is a side view of the operation unit 80 with the leg portion 86 being closed. This figure shows the operation unit 80 with the leg portion 86 being rotated to the first angle (angle value A is 15 degrees). FIG. 8B is a side view of the operation unit 80 with the leg portion 86 being opened. This figure shows the operation unit 80 with the leg portion 86 being rotated to the second angle (the value of the angle A is 30 degrees).

Figure 9A:
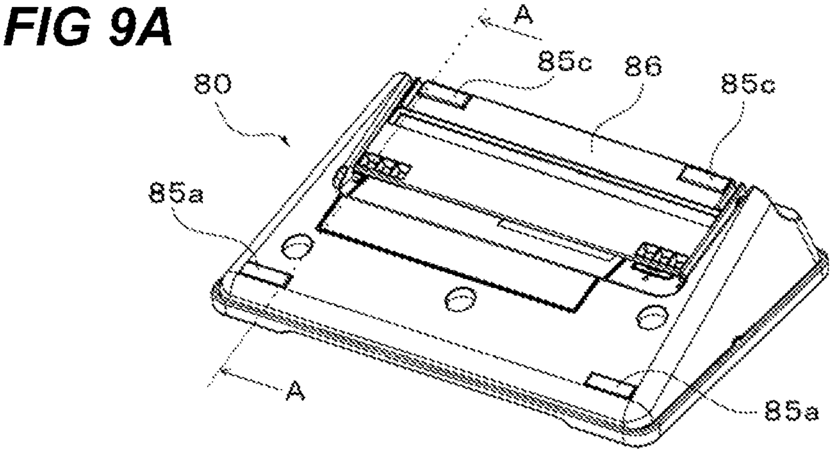
FIGS. 9A, 9B and 9C are diagrams, each showing a perspective view of the operation unit according to the first embodiment viewed from the bottom side.
Figure 9B:
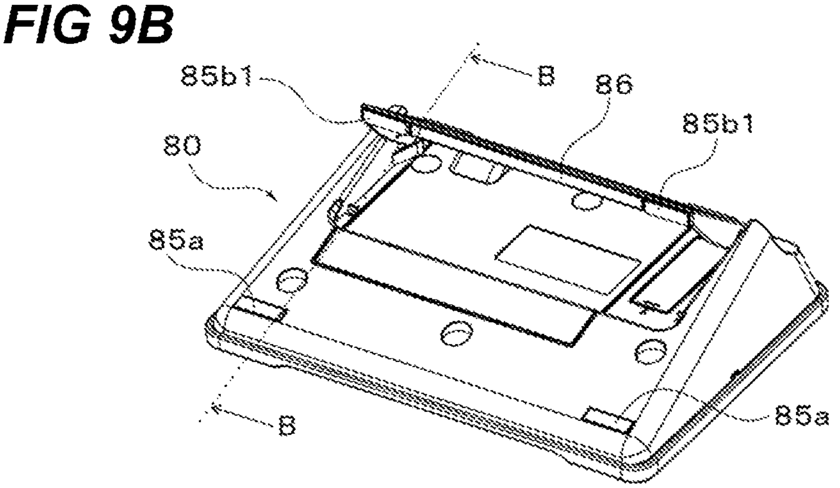
Figure 9C:
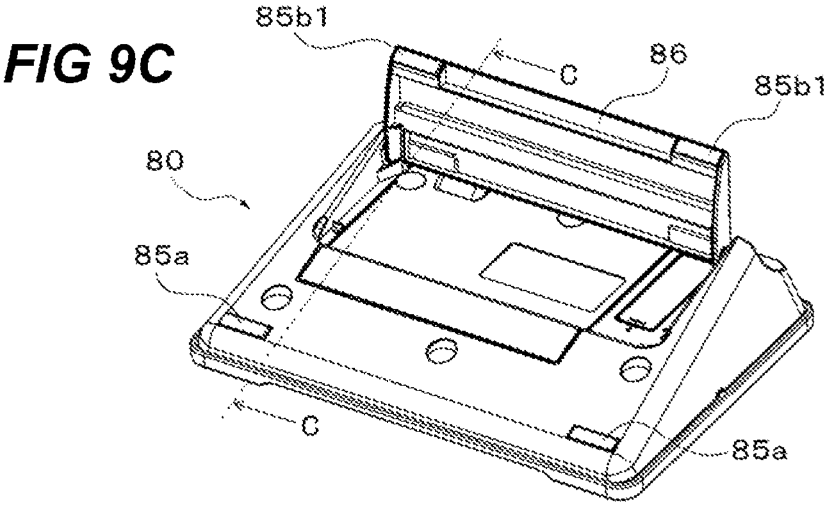
Figure 10A:
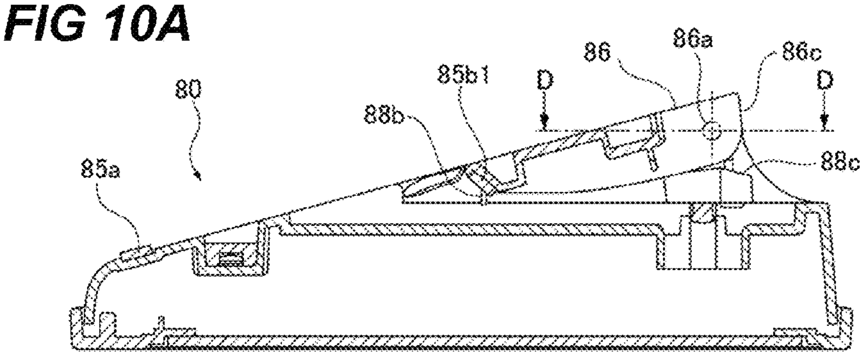
FIGS. 10A, 10B and 10C are schematic diagrams, each showing a cross-sectional view of the operation unit according to the first embodiment.

FIG. 9A is a diagram showing a perspective view of the bottom surface side of the operation unit 80 with the leg portion 86 being closed. FIG. 9B is a diagram showing a perspective view of the bottom surface side of the operation unit 80 in an intermediate state between the closed state and the open state of the leg portion 86. FIG. 9C is a diagram showing a perspective view of the bottom surface side of the operation unit 80 with the leg portion 86 being opened. FIG. 10A is a cross-sectional view along A-A of FIG. 9A, FIG.

Figure 10B:
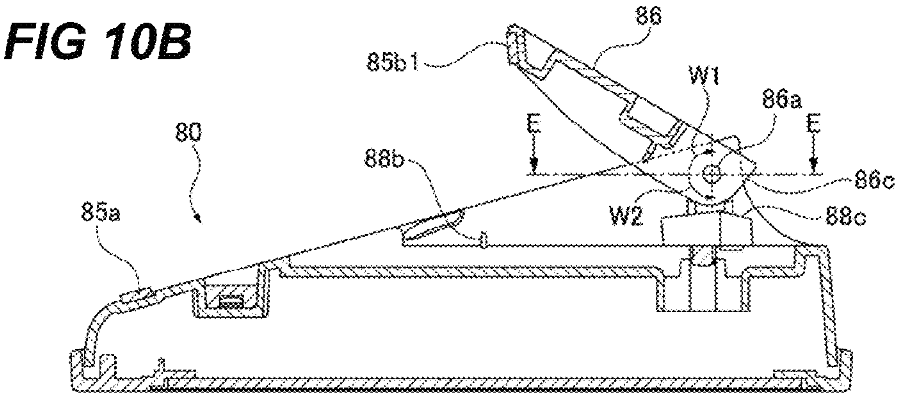
Figure 10C:
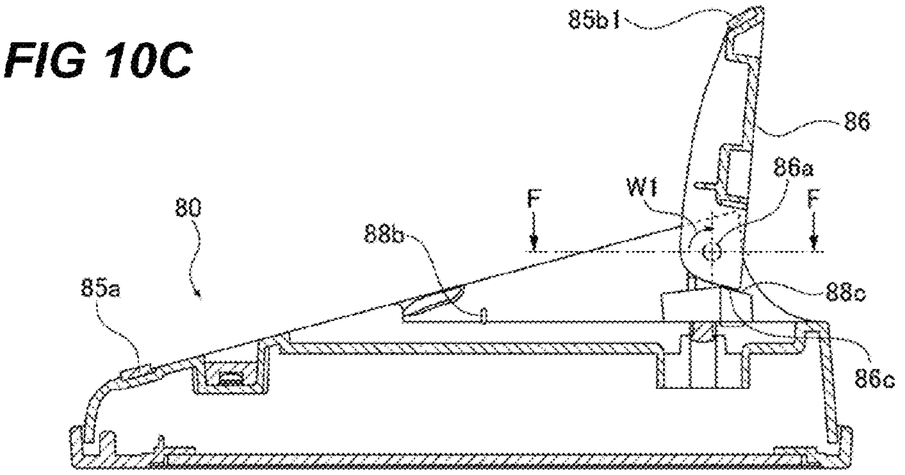

10B is a cross-sectional view along B-B of FIG. 9B, and FIG. 10C is a cross-sectional view along C-C of FIG. 9C.

As shown in FIGS. 6B and 7A, the leg portion 86 has the shaft (shaft portion) 86*a* which serves as a rotation center, and the mounting portion 86*e* provided such that the shaft 86*a* protrudes in the axial directions (left-right directions). The shaft 86*a* is provided on the mounting surface 86*f* of the mounting portion 86*e* so as to protrude in the axial direction. The mounting portion 86*e* is elastically deformable. Since the mounting portion 86*e* has the slit 86*d* on the side opposite to the side on which the shaft 86*a* is provided in the axial direction, the mounting portion 86*e* can be deflected in the axial direction (horizontal direction) of the shaft 86*a*. Further, in FIG. 6B, the mounting portion 86*e* has a plate-like configuration in which the length h1 in the axial directions (left-right directions) is shorter than the length h2 in the vertical direction perpendicular to the axial direction (left-right directions) (h1<h2). Therefore, the mounting portion 86*e* can be deflected in the axial direction (left-right directions) of the shaft 86*a*. As will be described later, the mounting portion 86*e* is elastically deformable in the axial directions (left-right directions) of the shaft 86*a* by applying an overload exceeding a predetermined load.

The mounting portion 86*e* has the abutting portion 86*c* that abuts on the restricting portion 88*c* of the operation unit 80 at the position of the second angle (the position shown in FIG. 8B). When the leg portion 86 is rotated in the first direction toward the second angle from the first angle, the abutting portion 86*c* abuts the restricting portion 88*c*, so that the leg portion 86 is restricted to take the second angle. As a result, the operation unit 80 is held at the position shown in FIG. 8B.

Here, the first direction is the direction indicted by the arrow w1 shown in FIG. 10B. The first direction is the direction of rotation in which the leg portion 86 is rotated from the position of the angle shown in FIG. 10A to the position of the second angle shown in FIG. 10C. The second direction is the direction of rotation opposite to the first direction, and is the direction indicated by the arrow w2 shown in FIG. 10B. The second direction is the direction of rotation in which the leg portion 86 is rotated from the position of the second angle shown in FIG. 10C toward the position of the first angle shown in FIG. 10A.

The leg portion 86 has the protruding portion 86*b* that abuts on the bearing (bearing portion) 88*a*, which will be described later. The protruding portion 86*b* is provided on the mounting surface 86*f* of the mounting portion 86*e* such that the protruding portion 86*b* protrudes in the same direction as the shaft 86*a*.

As shown in FIG. 7A, in the axial directions (left-right directions), the length of the protruding portion 86*b* from the mounting surface 86*f* to the tip is shorter than the length of the shaft 86*a* supported by the bearing 88*a*. In other words, in the axial direction, the protruding length of the protruding portion 86*b* is shorter than the length of the shaft 86*a* supported by the bearing 88*a*.

In addition, the leg portion 86 has the rubber feet 85*b*1 and the rubber feet 85*c*. The rubber feet 85*c* contact the top surface 109 together with the rubber feet 85*a* to form the rubber feet surfaces B at the position where the operation unit 80 makes the first angle shown in FIG. 8A. The rubber feet 85*b*1 contact the top surface 109 together with the rubber feet 85*a* to form the rubber feet surfaces B at the position where the operation unit 80 makes the second angle shown in FIG. 8B.

Although the configuration in which the rubber feet 85*c* are provided on the leg portion 86 is illustrated, the invention is not limited to this configuration. The rubber feet 85*c* can be provided on the side of the operation unit 80 and are configured such that the rubber feet 85*c* contact the top surface 109 together with the rubber feet 85*a* to form the rubber feet surfaces B at the position where the operation unit 80 makes the first angle shown in FIG. 8A.

This embodiment shows the configuration with four rubber feet 85 which contact the top 109 of the image forming apparatus when the operation unit 80 is placed on it, but the invention is not limited to this configuration. For example, the configuration may be adopted to have two rubber feet 85 by connecting the two rubber feet 85*b*1 and the two rubber feet 85*c* to each other, respectively.

In this way, the leg portion 86 is provided with the rubber feet 85*b*1, the rubber feet 85*c*, the shaft 86*a*, the protruding portion 86*b*, the abutting portion 86*c*, the slit 86*d*, and the mounting portion 86*e*. In FIG. 6B, only the configuration of one direction side of the leg portion 86 in the left-right directions (right direction R) is illustrated, and the opposite side (other side in the left-right directions (left direction L)) is not shown in the figure. However, as shown in FIG. 7A, the other direction side of leg portion 86 in the left-right directions (left direction L) also has the rubber foot 85*b*1, the rubber foot 85*c*, the shaft 86*a*, the protruding portion 86*b*, the abutting portion 86*c*, the slit 86*d*, the mounting portion 86*e* are provided symmetrically.

As shown in FIG. 7B, the operation unit 80 has the bearing (bearing portion) 88*a*, the protruding portion 88*b*, the restricting portion 88*c*, the guide portion 88*d*, and the contact portion 88*e*.

Figure 11A:
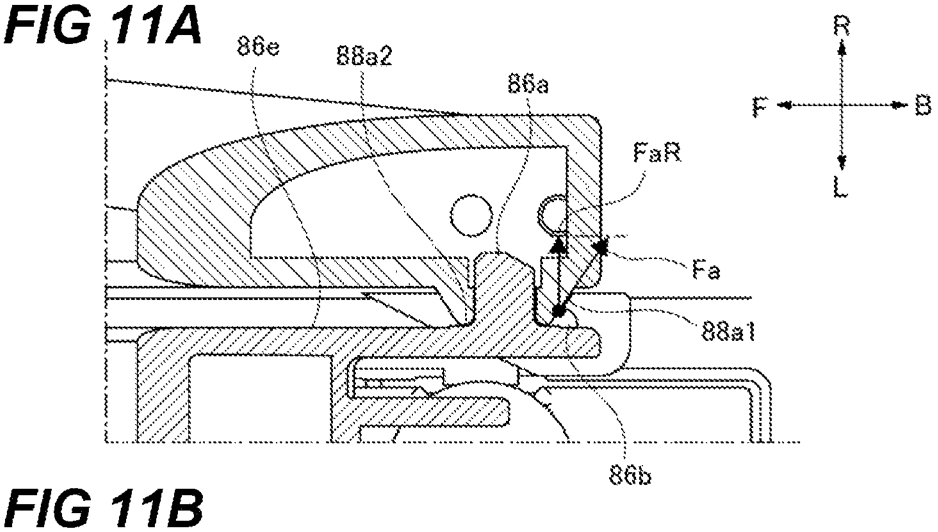
FIGS. 11A, 11B and 11C are diagrams, each showing a partial cross-sectional view of the operation unit according to the first embodiment viewed from the bottom side.
Figure 11B:
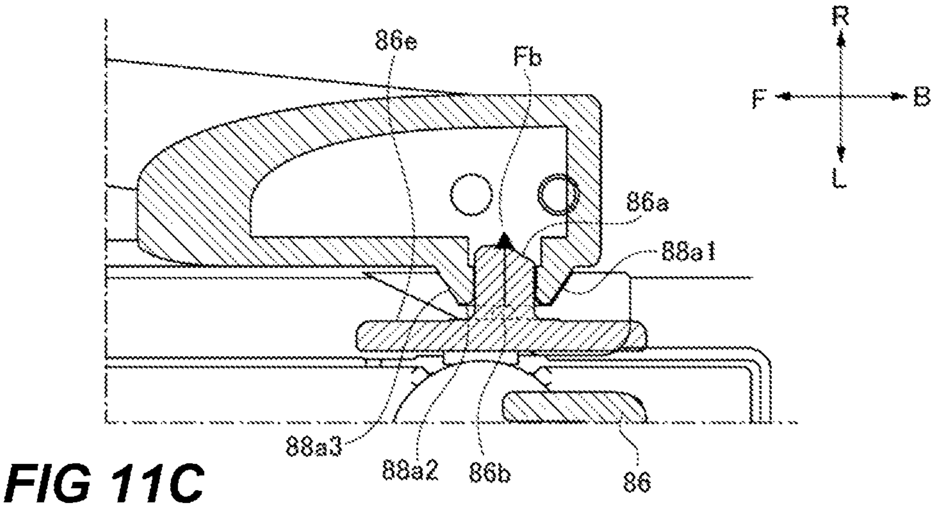
Figure 11C:
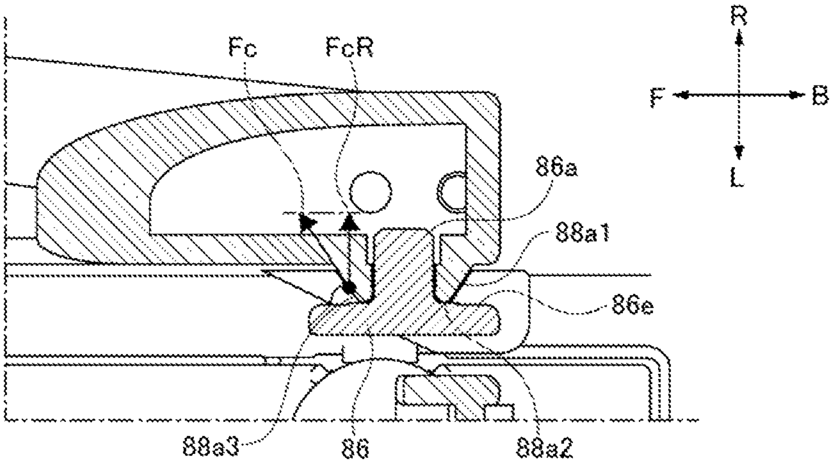
Figure 12A:
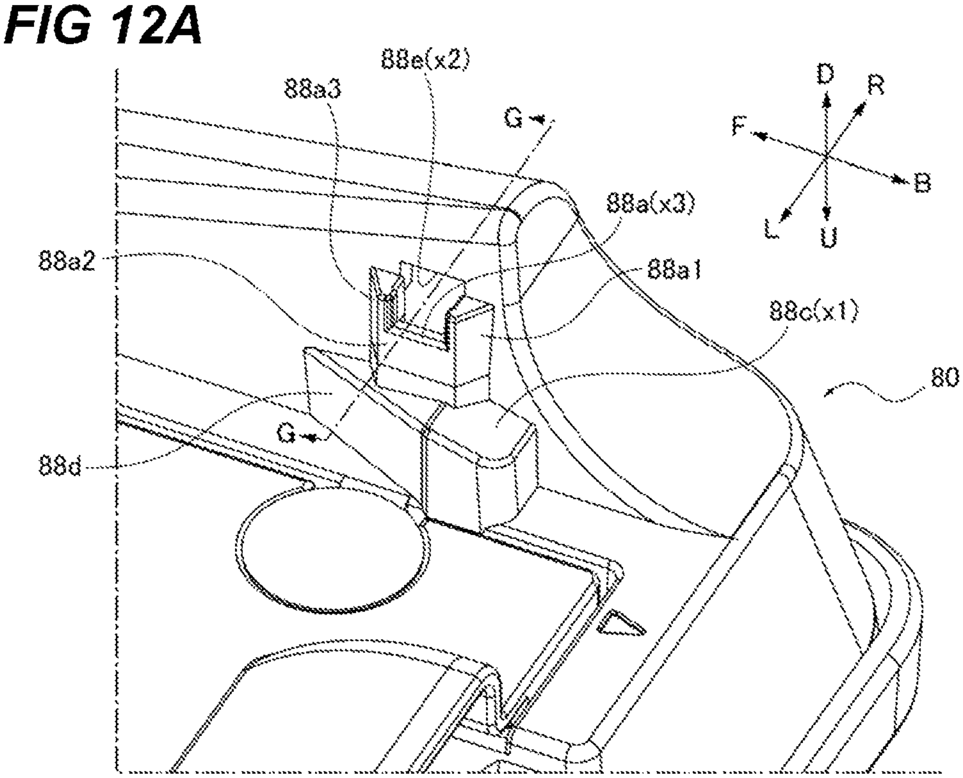
FIGS. 12A, 12B, and 12C are diagrams for describing the operation unit according to the first embodiment.

The bearing 88*a* as the bearing portion rotatably supports the shaft 86*a* of the leg portion 86. The bearing 88*a* has the second slope 88*a*1, the horizontal surface 88*a*2, and the first slope 88*a*3 as shown in FIG. 12A. As will be described below, the bearing 88*a* is positioned such that the protruding portion 86*b* contacts either the slope 88*a*1, the horizontal surface 88*a*2, or the slope 88*a*3 of the bearing 88*a* as the leg portion 86 rotates, as shown in FIGS. 11A through 11C.

The horizontal surface 88*a*2 is provided at a position between the position of the first angle and the position of the second angle and where the horizontal surface 88*a*2 abuts on the protruding portion 86*b* of the leg portion 86. The horizontal surface 88*a*2 abuts on the protruding portion 86*b* and elastically deforms the mounting portion 86*e* toward the direction opposite to that in which the protruding portion 86*b* protrudes, and continues to maintain this elastic deformation.

The first slope 88*a*3 is provided at a position between the horizontal surface 88*a*2 and the position of the second angle and where the first slope 88*a*3 contacts the protruding portion 86*b*. The first slope 88*a*3 restores the elastically deformed mounting portion 86*e* in the direction in which the protruding portion 86*b* protrudes from the horizontal surface 88*a*2 to the position of the second angle. The first slope 88*a*3 is inclined forward from the front end of the horizontal surface 88*a*2 in the forward-backward directions.

The second slope 88*a*1 is provided at a position between the horizontal surface 88*a*2 and the position of the first angle and where the second slope 88*a*1 contacts the protruding portion 86*b*. The second slope 88*a*1 restores the elastically deformed mounting portion 86*e* in the direction in which the protruding portion 86*b* protrudes from the horizontal surface 88*a*2 to the position of the first angle. The second slope 88*a*1 is inclined backward from the back end of the horizontal surface 88*a*2 in the forward-backward directions.

The protruding portion 88*b* abuts the rubber foot 85 of the leg portion 86 rotated to the position with the first angle b1 and restricts the leg portion 86 in the position with the first angle. When the leg portion 86 is closed as shown in FIG. 10A, the rubber foot 85*b*1 of the leg portion 86 abuts on the protruding portion 88*b*. Therefore, this configuration not only restricts the position of the leg portion, but also muffles the sound of the abutting.

Figure 12B:
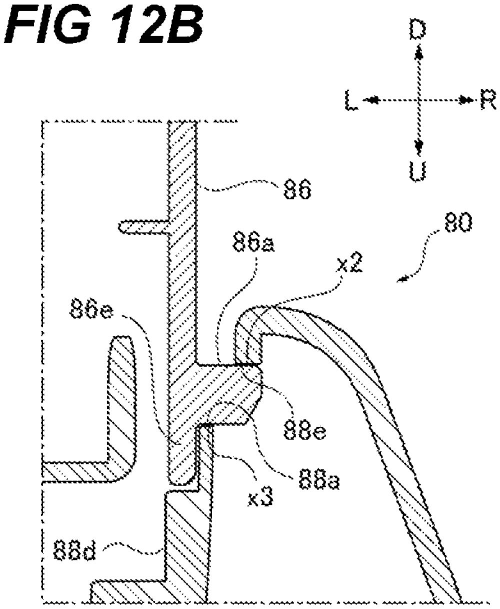
Figure 12C:
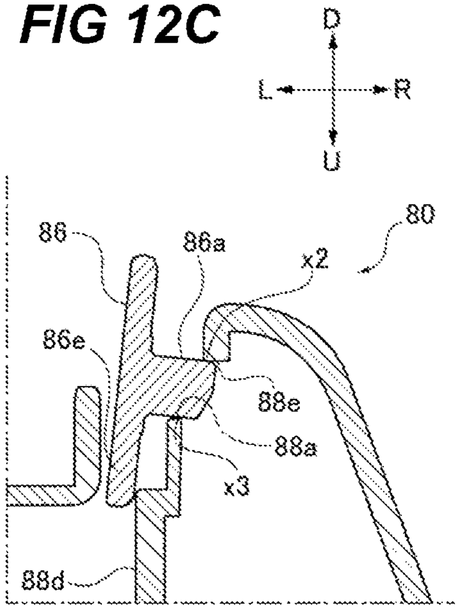

When the leg portion 86 is rotated in the first direction from the first angle to the second angle, the restricting portion 88*c* abuts the abutting portion 86*c* of the mounting portion 86*e* at the position where the operation unit 80 is at the second angle to restrict the rotation of the leg portion 86 in the first direction. The restricting portion 88*c* is provided at a different position from the bearing 88*a* in the axial directions (left right directions) of the shaft 86*a*. The restricting portion 88*c* is provided more inward than the bearing 88*a* in the axial directions, as shown in FIGS. 12A through 12C.

The abutting portion 88*e* abuts on the shaft 86*a*. The abutting portion 88*e* is provided on the opposite side of the bearing 88*a* from the restricting portion 88*c* in the axial direction (left-right directions) through the bearing 88*a*. The abutting portion 88*e* is located more outward than the bearing 88*a* in the axial directions, as shown in FIGS. 12A through 12C.

As shown in FIGS. 7B and 12A, the guide portion 88*d* is provided on the side surface of the restricting portion 88*c* which protrudes from the operation unit 80. The guide portion 88*d* guides the mounting portion 86*e*, which is released from the abutting with the restricting portion 88*c* by the rotational force in the first direction against the leg portion 86 at the position with the second angle, to the position where the mounting portion 86*e* can be restricted by the restricting portion 88*c*.

The guide portion 88*d* is shaped to abut the mounting portion 86*e* and elastically deform the mounting portion 86*e* in the direction opposite to the direction in which the shaft 86*a* protrudes in the axial directions when the leg portion 86 is rotated in the second direction, opposite to the first direction. Furthermore, the guide portion 88*d* is shaped to release the abutting and to restore the mounting portion 86*e* to a position where the mounting portion 86*e* can be restricted by the regulating portion 88*c*.

Thus, the operation unit 80 has the bearing 88*a*, the protruding portion 88*b*, the restricting portion 88*c*, the guide portion 88*d*, and the abutting portion 88*e*. In FIG. 7B, only the configuration of one side (right direction R) of the operation unit 80 in the left-right directions is illustrated, while the opposite side (the other side (left direction L)) in the left-right directions is not shown. However, on the other side (left direction L) of the operation unit 80, the bearing 88*a*, the protruding portion 88*b*, the restricting portion 88*c*, the guide portion 88*d*, and the abutting portion 88*e* are also provided in a symmetrical manner.

FIG. 6A shows the operation unit 80 with the leg portion 86 being attached to the operation unit 80. The attachment of the leg portion 86 is performed by inserting the shaft 86*a* of the leg portion 86 shown in FIG. 6B into the bearing 88*a* shown in FIG. 7B. When inserting the shaft 86*a* into the bearing 88*a*, the mounting portion 86*e* provided with the shaft 86*a* is deflected using the slit 86*d* of the leg portion 86 shown in FIG. 7A.

As described with reference to FIGS. 6A to 7B, the leg portion 86 is attached to the operation unit 80 via the shaft 86*a*. Therefore, the leg portion 86 can be opened and closed around the shaft 86*a* as shown in FIGS. 8A and 8B. Also, when the leg portion 86 is closed as shown in FIGS. 8A and 10A, the rubber foot 85*b*1 butts against the protruding portion 88*b*, and when the leg portion 86 is opened as shown in FIGS. 8C and 10C, the abutting portion 86*c* butts against the restricting portion 88*c*. As a result, the angle of the leg portion 86 is restricted to the position shown in FIG. 10A and to the position shown in FIG. 10C. Therefore, as shown in FIGS. 8A and 8B, the angle A of the operation unit can be adjusted in two stages: a first angle (15 degrees) when the leg portion 86 is closed and a second angle (30 degrees) when the leg portion 86 is opened.

As described above, the rubber foot 85*b*1 abuts on the protruding portion 88*b* when the leg portion 86 is closed as shown in FIG. 10A not only to restrict the position, but also to muffle the sound of the abutting.

Next, the drawing force when switching the leg portion 86 between the position of the first angle and the position of the second angle will be described. FIGS. 11A to 11C are drawings showing cross-sectional views of the vicinity of the shaft 86*a* of the leg portion 86 as viewed from the bottom surface side of the operation unit 80. FIG. 11A is a drawing showing a cross-sectional view of a state in which the leg portion 86 is closed, and is a cross-sectional view taken along line D-D in FIG. 10A. FIG. 11B is a drawing showing a cross-sectional view of an intermediate state between the state in which the leg portion 86 is closed and the state in which the leg portion 86 is opened, and is a cross-sectional view taken along line E-E in FIG. 10B. FIG. 11C is a drawing showing a cross-sectional view of a state in which the leg portion 86 is opened, and is a cross-sectional view taken along line F-F in FIG. 10C.

The arrows F, B, L, and R shown in FIGS. 11A to 11C indicate directions when the operation unit 80 is placed on the top surface 109 of the image forming apparatus. As described above, the direction to the front side of the image forming apparatus 2 is the forward direction F, the direction to the back (rear) side is the backward direction B, the direction to the left side is the left direction L, and the direction to the right side is the right direction R. As shown in FIGS. 11A to 11C, the protruding portion 86*b* of the leg portion 86 abuts on any one of the slope 88*a*1, the horizontal surface 88*a*2, and the slope 88*a*3 of the bearing 88*a* depending on whether the leg portion 86 is opened or closed.

As shown in FIG. 11B, when the leg portion 86 is in the intermediate state, neither closed nor open, the protruding portion 86*b* of leg portion 86 abuts the horizontal surface 88*a*2. Therefore, the mounting portion 86*e* is deflected in the left direction L, which is the direction opposite to the direction in which the shaft 86*a* protrudes, and a restoring force acts in the right direction R, so that the horizontal surface pushing force Fb is generated, with which the protruding portion 86*b* presses the horizontal surface 88*a*2. Since the horizontal surface pressing force Fb acts in a direction orthogonal to the horizontal surface 88*a*2, no sliding force in the forward direction F or the backward direction B is generated on the protruding portion 86*b*. Therefore, no drawing force is generated while the protruding portion 86*b* abuts on the horizontal surface 88*a*2.

Further, as described above, in the axial direction (horizontal direction), the length from the mounting surface 86*f* to the tip of the protruding portion 86*b* is shorter than the shaft 86*a*'s length supported by the bearing 88*a*. Therefore, even if the protruding portion 86*b* abuts on the horizontal surface 88*a*2 of the bearing 88*a* and the mounting portion 86*e* is deflected, the shaft 86*a* remains supported by the bearing 88*a*.

The leg portion 86 having the elastically deformed mounting portion 86*e* is rotated in the second direction (the direction of the arrow w2 shown in FIG. 10B) toward the position of the first angle from the horizontal plane 88*a*2. In other words, the leg portion 86 is rotated in the direction in which the leg portion 86 is closed. The mounting portion 86*e* is deflected in the left direction L, and a restoring force in the right direction R acts. Therefore, as shown in FIG. 11A, the slope pressing force FaR is generated, which is a force with which the protruding portion 86*b* presses the second slope 88*a*1 in the axial direction. Since the slope pressing force FaR acts on the second slope 88*a*1, the protruding portion 86*b* continues to slide on the second slope 88*a*1 by the slope direction pressing force Fa of the second slope 88*a*1 until the opening/closing angle is restricted. As a result, the force Fa with which the protruding portion 86*b* slides on the second slope 88*a*1 is converted into a force closing the leg portion 86 (a rotational force in the second direction) via the shaft 86*a*. Therefore, a drawing force is generated when the leg portion 86 is switched to the position of the first angle.

The leg portion 86 having the elastically deformed mounting portion 86*e* is rotated in the first direction (the direction of the arrow w1 shown in FIG. 10B) toward the position of the second angle from the horizontal plane 88*a*2. In other words, the leg portion 86 is rotated in the direction in which the leg portion 86 is opened. The mounting portion 86*e* is deflected in the left direction L, and a restoring force in the right direction R acts. Therefore, as shown in FIG. 11C, the slope pressing force FcR is generated, which is a force with which the protruding portion 86*b* presses the first slope 88*a*3 in the axial direction. Since the slope pressing force FcR acts on the first slope 88*a*3, the protruding portion 86*b* continues to slide on the first slope 88*a*3 by the slope direction pressing force Fc of the first slope 88*a*3 until the opening/closing angle is restricted. As a result, the force Fc with which the protruding portion 86*b* slides on the first slope 88*a*3 is converted into a force opening the leg portion 86 (a rotational force in the first direction) via the shaft 86*a*. Therefore, a drawing force is generated when the leg portion 86 is switched to the position of the second angle.

(Behavior of Leg Portion when Overload is Applied to Panel Surface of Operation Unit)

Next, the behavior of the leg portion 86 when an overload is applied to the panel surface C of the operation unit 80 will be described. A consideration will be given to the case where an overload exceeding the predetermined load is applied to the panel surface C of the operation unit 80 with the leg portion 86 being open as shown in FIG. 8B. For example, as an overload, a very strong force is applied that exceeds the typical operating force of 1.5 N (predetermined load) of the display 82. Then, the leg portion 86, which is restricted at the position with the second angle, receives a force for opening the leg portion 86 further, which is a rotational force in the first direction (the direction indicated by the arrow w1 of FIG. 10B). In such a case, an overload may be transmitted to the restricting portion 88*c* on the side of the operation unit 80 through the abutting portion 86*c* of the leg portion 86, and the restricting portion 88*c* may be damaged.

Therefore, the operation unit 80 of this embodiment assumes the above-described overload and has a function of preventing damage to the restricting portion 88*c* that restricts the opening/closing angle of the leg portion 86.

A description will be given of the behavior of preventing damage when an overload is applied to the panel surface C of the operation unit 80 with the leg portion 86 being open using FIGS. 12A to 12C, 13A, 13B, 14A, and 14B.

Figure 13A:
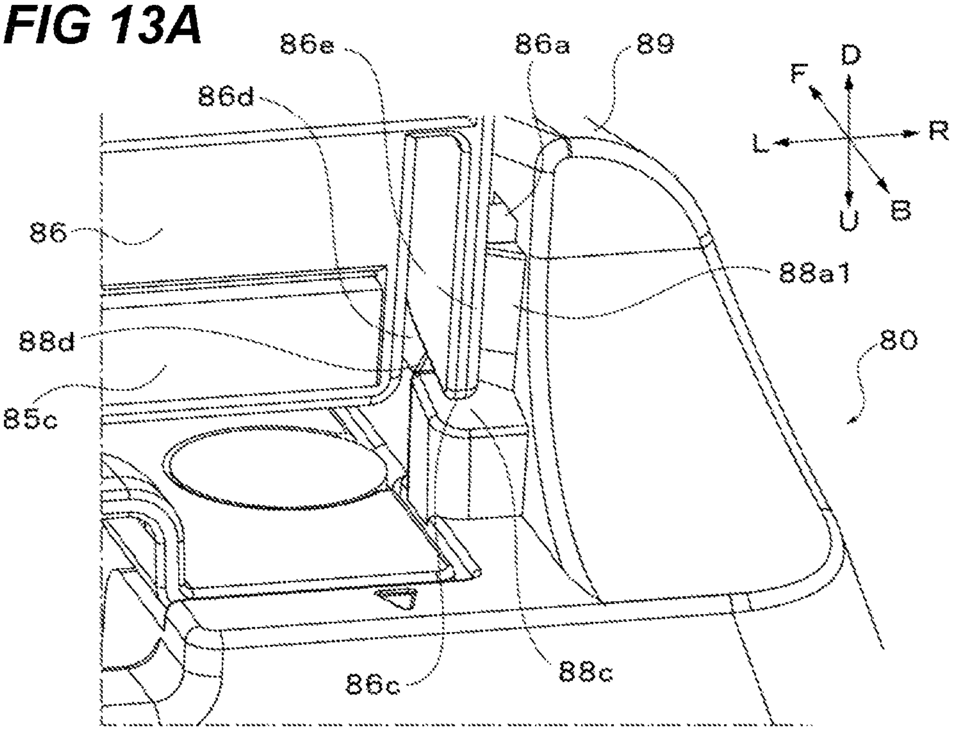
FIGS. 13A and 13B are diagrams for describing the operation unit according to the first embodiment.
Figure 13B:
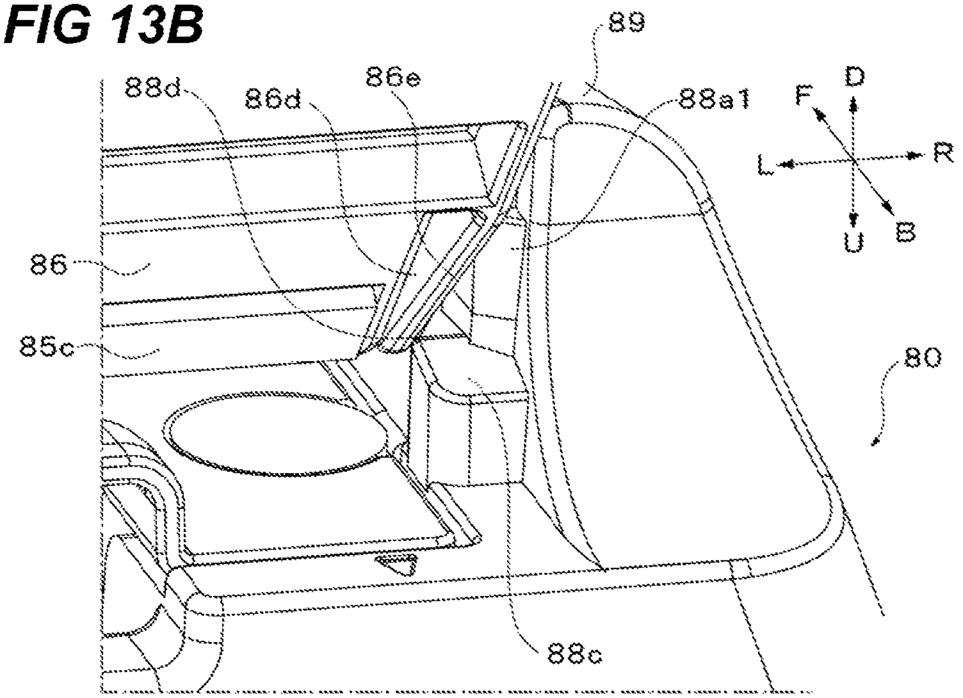
Figure 14A:
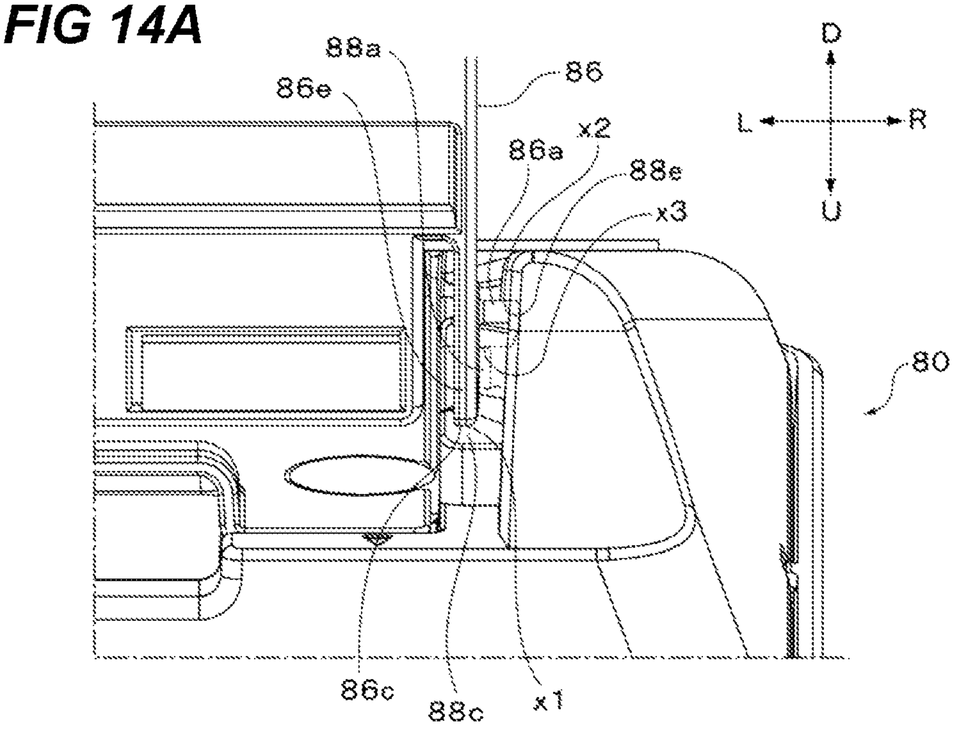
FIGS. 14A and 14B are diagrams for describing the operation unit according to the first embodiment.
Figure 14B:
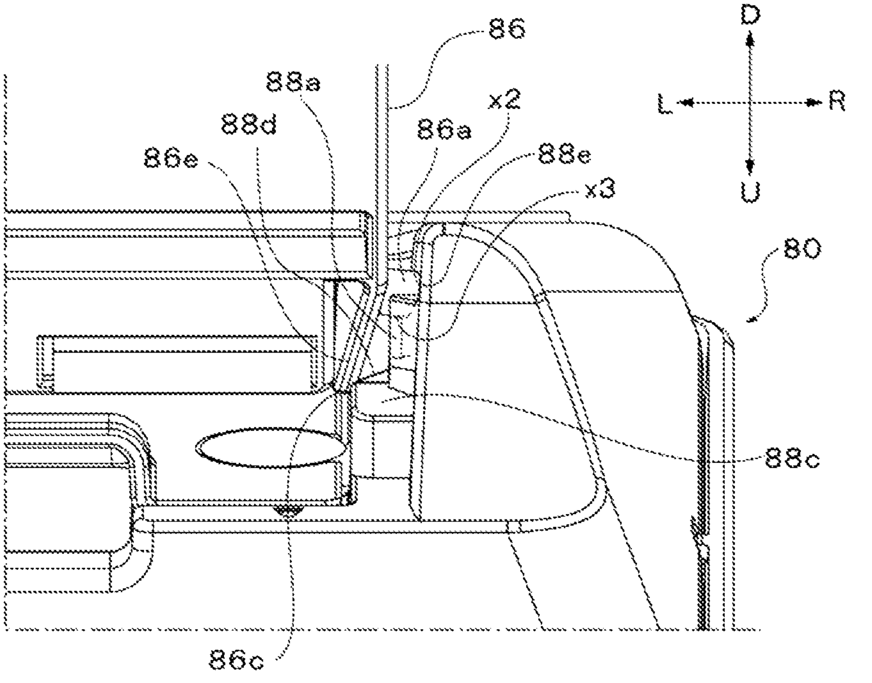

FIG. 12A is a drawing showing a perspective view around the bearing of the operation unit 80 excluding the leg portion. FIGS. 12B and 12C are drawings each of which is a cross-sectional view around the bearing of the operation unit 80 including the leg portion 86, and is a cross-sectional view taken along the line G-G in FIG. 12A. FIGS. 13A and 14A are explanatory diagrams showing the vicinity of the bearing of the operation unit 80 when the leg portion 86 is restricted to the second position. FIGS. 13B and 14B are explanatory diagrams showing the vicinity of the bearing of the operation unit 80 with the restriction of the leg portion 86 being released.

FIGS. 13A and 14A are perspective views each of which shows the restricting portion 88*c* and its vicinity of the restricting portion 88*c* with the leg portion 86 being open (at the position with the second angle). FIGS. 13B and 14B are perspective views each of which shows the restricting portion 88*c* and its vicinity when an overload is applied to the panel surface C of the operation unit 80 with the leg portion 86 being open.

FIG. 8C is a drawing showing a side view of the operation unit 80 in a state in which an overload is applied to the panel surface C of the operation unit 80 with the leg portion 86 being opened, and the abutting portion 86*c* of the leg portion 86 is disengaged from the restricting portion 88*c* that restricts the opening/closing angle.

As shown in FIGS. 12B and 12C, the restricting portion 88*c* of the operation unit 80 is provided at a different position from that of the bearing 88*a* in the axial directions of the shaft 86*a* (horizontal directions). The abutting portion 88*e* is provided on the opposite side of the bearing 88*a* from the restricting portion 88*c* in the axial direction via the bearing 88*a*. In the axial directions, the restricting portion 88*c* is provided inside the bearing 88*a* and the abutting portion 88*e* is provided outside the bearing 88*a*.

Further, as shown in FIG. 12B, in the direction crossing the axial direction, the first abutting portion x1 of the restricting portion 88*c* on which the abutting portion 86*c* abuts at the position of the second angle and the second abutting portion x2 of the abutting portion 88*e* on which the shaft 86*a* abuts are located such that they are opposed to each other via the abutting portion x3 of the bearing 88*a* on which the shaft 86*a* contacts.

As shown in FIGS. 13A and 14A, when the leg portion 86 is opened as shown in FIG. 10C, the leg portion 86 is restricted to the position with the second angle where the abutting portion 86*c* of the leg portion 86 abuts on the restricting portion 88*c* that restricts the opening/closing angle. On the other hand, as shown in FIGS. 13B and 14B, when an overload is applied to the panel surface C of the operation unit 80 with the leg portion 86 being opened, the mounting portion 86*e* of the leg portion 86 is deflected greatly in the left direction L.

In detail, when the leg portion 86 which is restricted to the position with the second angle shown in FIG. 10C operates as follows when an overload exceeding the predetermined load is applied to the operation unit 80. The rotational force in the first direction due to the overload is applied to the leg portion 86 which is restricted to the position with the second angle in the direction of the arrow w1 shown in FIG. 10C. At this time, the abutting portion 86*c* of the mounting portion 86*e* receives a reaction force in the downward direction D from the restricting portion 88*c*, and the shaft 86*a* also receives a force in the upward direction U from the abutting portion 88*e*. Then, due to the reaction force in the downward direction D and the force in the upward direction U with the contact portion x3 on which the shaft 86*a* contacts being as a fulcrum, the mounting portion 86*e* is deflects in in the left direction L. In other words, the mounting portion 86*e* is elastically deformed in the axial direction in the opposite direction to that in which the shaft

86*a* protrudes. As shown in FIG. 12C, the abutting between the restricting portion 88*c* and the mounting portion 86*e* is released, and the operation unit 80 is in the state shown in FIG. 8C.

In other words, when the abutting between the mounting portion 86*e* and the restricting portion 88*c* is released at the position with the second angle due to the rotational force to the first direction, the leg portion 86 is in the state shown in FIG. 8C. At this time, the leg portion 86 is rotated to the position where the leg portion 86 does not protrude from the operation unit 80 toward the top surface 109.

As shown in FIG. 8C, when the abutting portion 86*c* of the leg portion 86 of the operation unit 80 is disengaged from the restricting portion 88*c* that restricts the opening/closing angle, the leg portion 86 does not protrude from the surface D formed by the front side rubber foot 85*a* and the contact point 89. In this state, even if an overload is applied to the panel surface C, a force is not applied to the leg portion 86, thereby preventing damage to the restricting portion 88*c* that restricts the opening/closing angle of the leg portion 86.

When the abutting is released from the state in which the operation unit 80 is restricted to the position with the second angle, the shaft 86*a*'s axial length supported by the bearing 88*a* is larger than the axial length in which the restricting portion 88*c* maintains the abutting on the mounting portion 86*e*. As a result, even when the restriction between the abutting portion 86*c* of the leg portion 86 and the restricting portion 88*c* is released, the engaging amount of the shaft 86*a* with the bearing 88*a* does not become less than 0. This prevents the leg portion 86 from being disengaged from the operation unit 80. Therefore, the leg portion 86 does not come off from the operation unit 80.

Then, the leg portion 86 with the abutting portion 86*c* disengaged from the restricting portion 88*c* is moved back in the closing direction, the mounting portion 86*e* is guided by the guide portion 88*d*. As a result, the mounting portion 86*e* deflects to the left direction L along the guide portion 88*d*, and abutting portion 86*c* of the leg portion 86 abuts on the restricting portion 88*c* again and returns to the original state.

In this embodiment, when the abutting portion 86*c* of the leg portion 86 is disengaged from the restricting portion 88*c*, the leg portion 86 is not disengaged from the operation unit 80 because the engaging amount of the shaft 86*a* with the bearing 88*a* is not equal to nor less than 0, so that the leg portion 86 can easily return to its original state. However, the configuration may be adopted in which the engaging amount becomes less than 0 and the leg portion 86 is disengaged from the operation unit 80.

According to this embodiment, even if a rotational force in the first direction due to an overload is applied to the leg portion 86, the mounting portion 86*e* is elastically deformed to release the abutting between the restricting portion 88*c* and the mounting portion 86*e*, thereby preventing the damage of the leg portion 86 and the restricting portion 88*c*.

After the leg portion 86 is disengaged from the restricting portion 88*c*, when the leg portion 86 is moved back to the closing direction, the leg portion is guided by the guide portion 88*d*, and the abutting portion 86*c* of the leg portion 86 abuts on the restricting portion 88*c* again and returns to its original state.

Second Embodiment

In the first embodiment, the angle A of the operation unit 80 is able to be set to 15 degrees (first angle) and 30 degrees (second angle). In this embodiment the angle A of the operation unit 80 is able to be set to 0 degrees (first angle) and 20 degrees (second angle).

The operation unit of this embodiment will be described with reference to FIGS. 15 and 16A to 16C. In the operation unit of this embodiment, members having functions equivalent to those of the members of the first embodiment are denoted by the same reference numerals.

Figure 15:
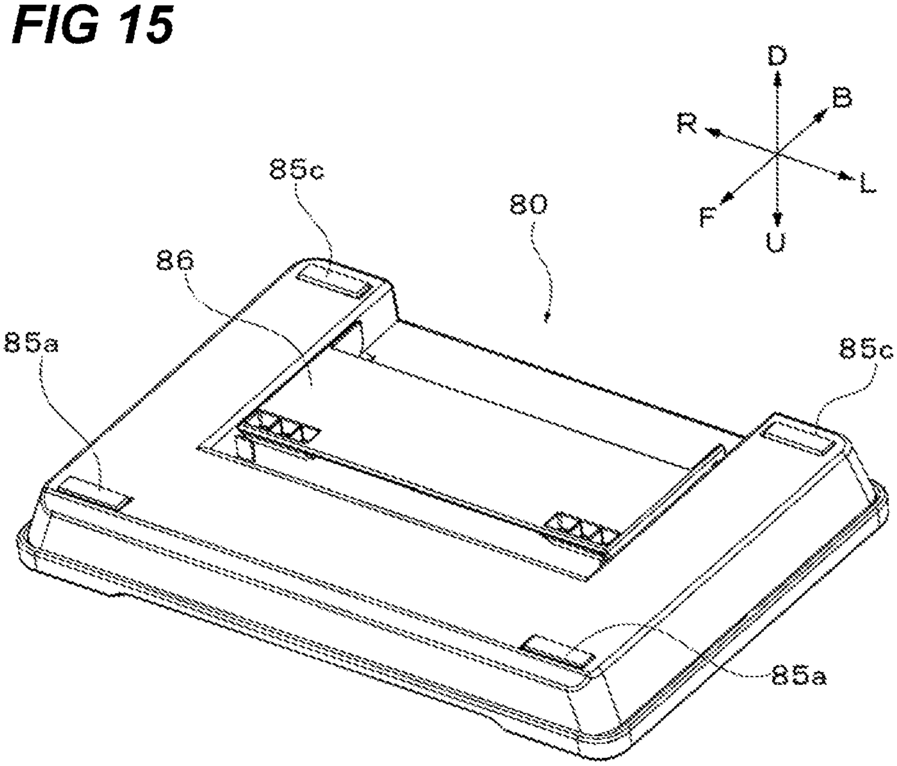
FIG. 15 is a diagram showing a perspective view of the operation unit according to the second embodiment viewed from the bottom.
Figure 16A:
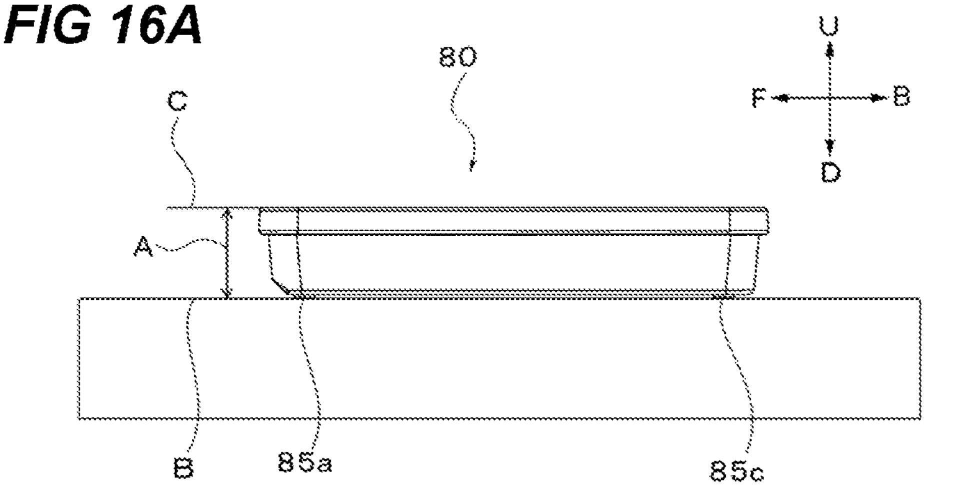
FIGS. 16A, 16B and 16C are diagrams, each showing a side view of the operation unit according to the second embodiment.
Figure 16B:
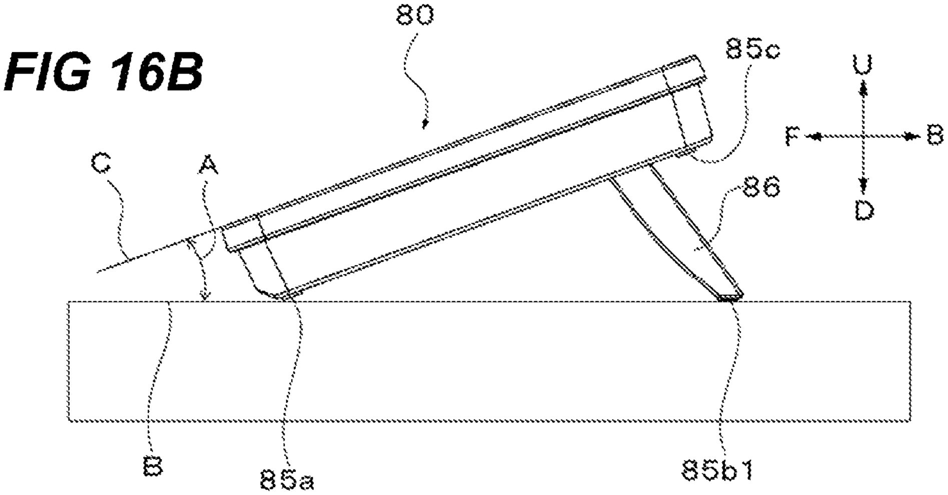
Figure 16C:
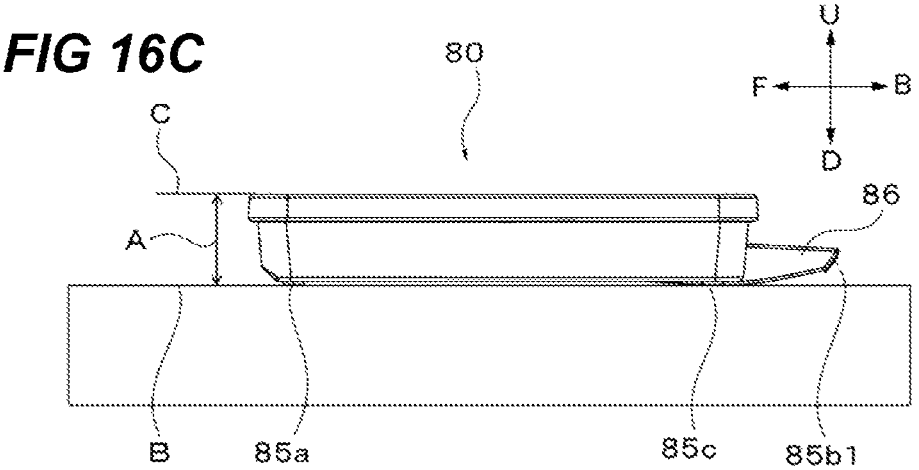

FIG. 15 is a drawing showing a perspective view of the bottom surface side of the operation unit 80 with the leg portion 86 being closed. FIG. 16A is a drawing showing a side view of the operation unit 80 with the leg portion 86 being closed. FIG. 16A is a drawing showing a side view of the operation unit 80 at the position of the first angle, exemplifying 0 degrees as the first angle. FIG. 16B is a drawing showing a side view of the operation unit 80 with the leg portion 86 being opened. FIG. 16B is a drawing showing a side view of the operating unit at the position of the second angle, exemplifying 20 degrees as the second angle. FIG. 16C is a drawing showing a side view of the operation unit 80 in a state in which the abutting portion (not shown) of the leg portion 86 is disengaged from the restricting portion (not shown) that restricts the opening/closing angle.

In the first embodiment described above, the lower limit of the angle A of the operation unit is desirably 5 degrees. This is because a user standing near the front side of the apparatus can easily recognize the direction of the front surface of the operation unit 80. However, if the panel surface C of the operation unit 80 is printed with characters or the like that supplement the functions of the operation unit 80 and the orientation of the operation unit 80 is easy to recognize, the lower limit of the angle A of the operation unit 80 may be 0 degrees as shown in FIGS. 15, 16A to 16C.

In the first embodiment described above, the rubber feet 85*c* are provided on the leg portion 86, whereas in this embodiment, the rubber feet 85*c* are provided on the operation unit 80.

When the angle of the operation unit (the angle formed by the display surface 820 (panel surface C) of the display 82 and the top surface 109 (rubber foot surface B) that is the placement surface) is in the range of 0 to 45 degrees, even if the first angle and the second angle are changed, the same effect as in the first embodiment described above can be obtained.

Third Embodiment

FIG. 17A is a drawing showing a perspective view of the bottom surface side of the operation unit 80. FIG. 17B is a drawing showing a perspective view of the leg portion 86. FIG. 17C is a drawing showing a bottom side view of the operation unit 80 with the leg portion 86 being removed. In the operation unit of this embodiment, members having functions equivalent to those of the members of the first embodiment are denoted by the same reference numerals.

In the first embodiment, a slit 86*d* is provided in the leg portion 86 so that the mounting portion 86*e* is deflected in order to generate a drawing force when the leg portion 86 is attached to the operation unit 80 and when the leg portion 86 is opened and closed. However, as shown in FIGS. 17A to 17C, the configuration may be adopted in which the slit 88*g* is provided in the vicinity of the bearing 88*a* of the operation unit 80 so that the vicinity of the bearing 88*a* of the operation unit 80 is deflected in the right direction R (the opposing portion of the same shape is deflected to the left direction L).

In other words, the operation unit 80 of this embodiment has the bearing 88*a*, the restricting portion 88*c*, the abutting portion 88*e*, and the second mounting portion 88*h* that can be elastically deformed by an overload exceeding a predetermined load.

With this configuration, when a rotational force in the first direction due to an overload is applied to the leg portion 86 that is restricted at the position of the second angle, the second mounting portion 88*h* is elastically deformed in the direction in which the shaft 86*a* protrudes in the axial directions. As a result, the abutting between the restricting portion 88*c* and the mounting portion 86*e* is released, and the same effects as in the first embodiment can be obtained.

Fourth Embodiment

In the first embodiment, the single leg portion 86 is provided. However, separated multiple leg portions 86 may be provided as shown in FIGS. 18A to 19B. In other words, the operation unit 80 of this embodiment has multiple leg portions 86 that are rotatably provided. In the operation unit of this embodiment, members having functions equivalent to those of the members of the first embodiment are denoted by the same reference numerals.

Figure 18A:
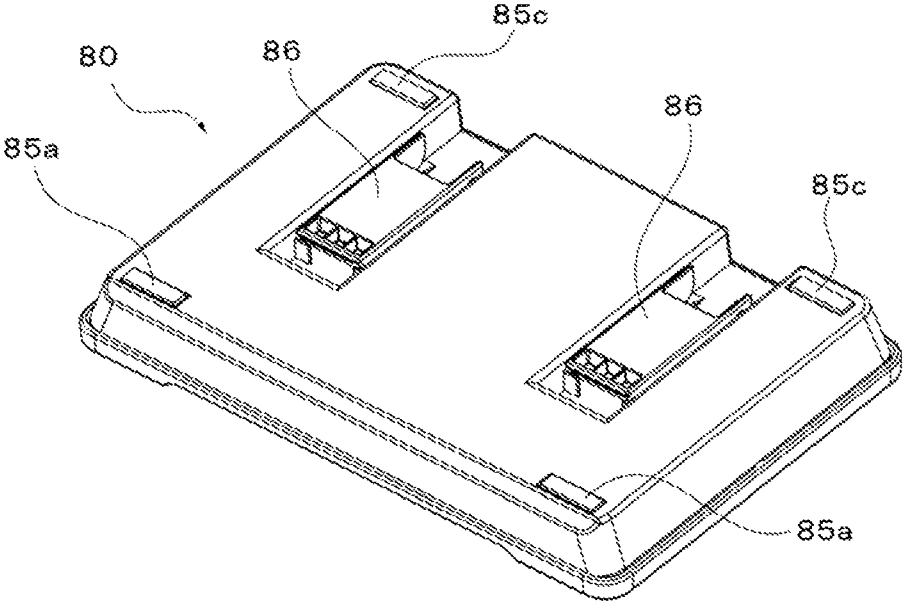
FIGS. 18A and 18B are diagrams, each showing a perspective view of the operation unit according to the fourth embodiment viewed from the bottom.
Figure 18B:
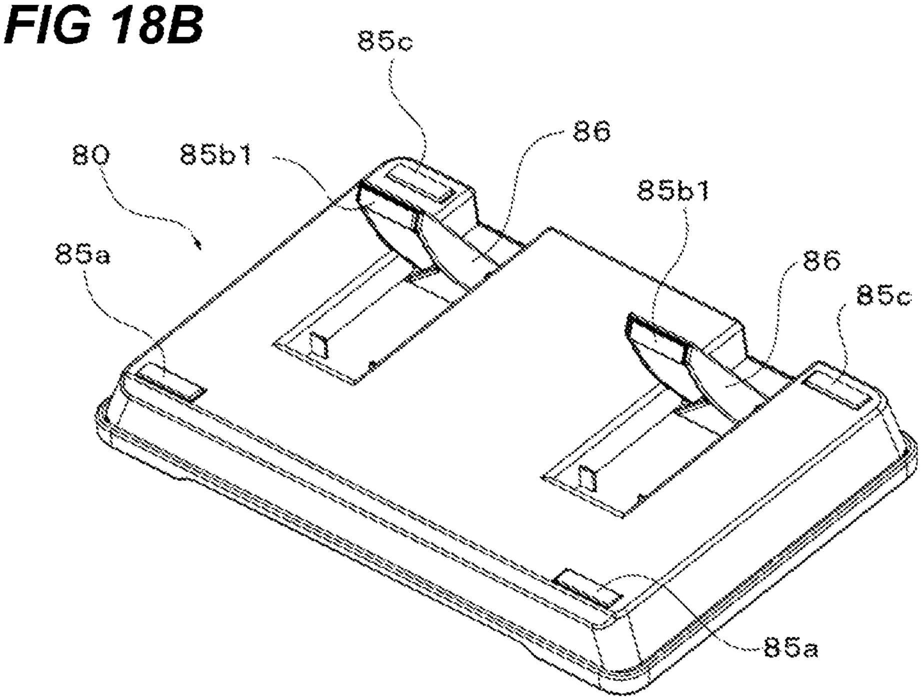
Figure 19A:
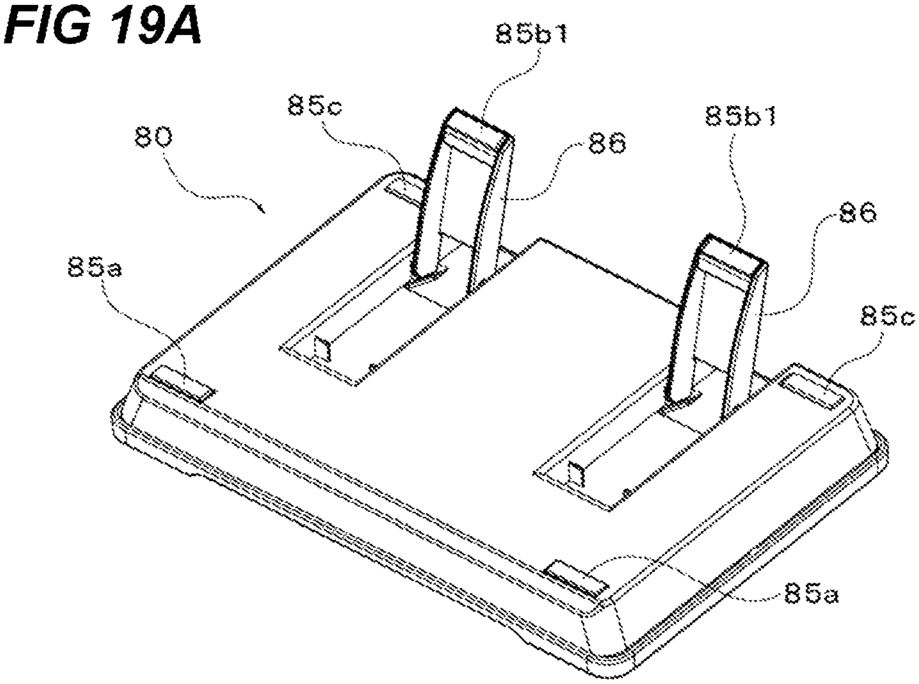
FIGS. 19A and 19B are diagrams, each showing a perspective view of the operation unit according to the fourth embodiment viewed from the bottom.
Figure 19B:
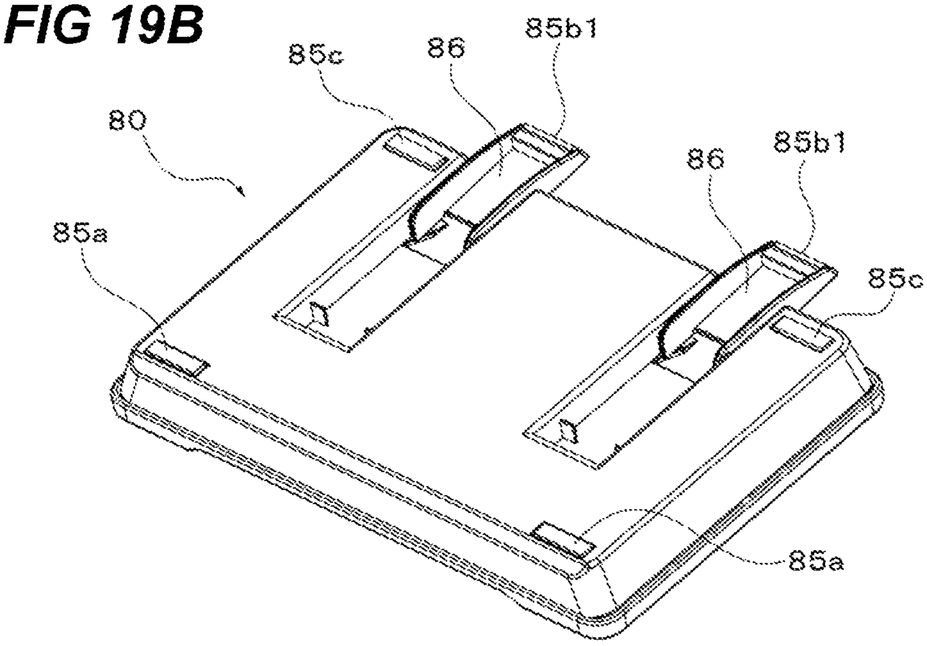

FIG. 18A is a drawing showing a perspective view of the bottom surface side of the operation unit 80 with the leg portions 86 being closed (the angle A of the operation unit is 0 degrees). FIG. 18B is a drawing showing a perspective view of the bottom surface side of the operation unit 80 in an intermediate state between the closed state and the open state of the leg portions 86. FIG. 19A is a drawing showing a perspective view of the bottom surface side of the operation unit 80 with the leg portions 86 being opened (the angle A of the operation unit is 20 degrees). FIG. 19B is a drawing showing a perspective view of the bottom surface side of the operation unit 80 in a state where the abutting portion of the leg portions 86 is disengaged from the protruding portion that restricts the opening/closing angle.

As described above, even with the configuration in which multiple leg portions 86 are rotatably provided, the same effect as in the first embodiment described above can be obtained.

Fifth Embodiment

Figure 20A:
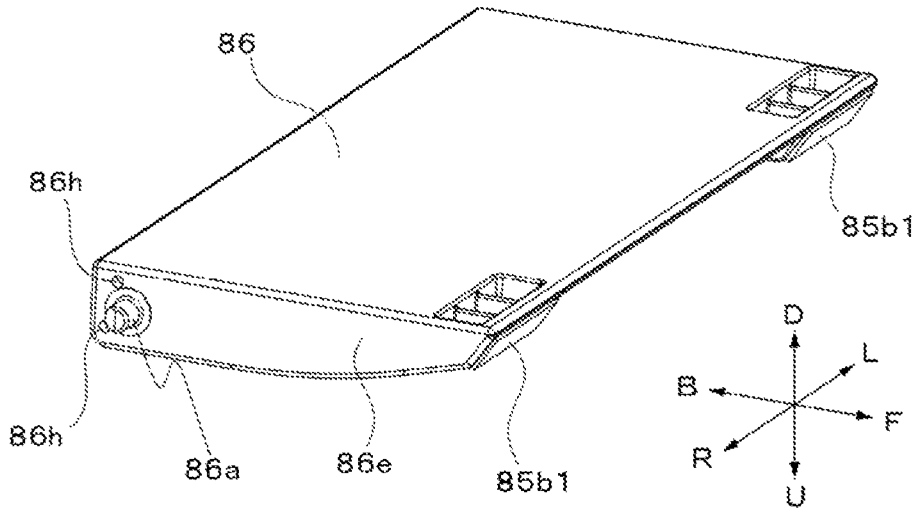
FIGS. 20A and 20B are diagrams, each showing a perspective view of the operation unit according to the fifth embodiment.
Figure 20B:
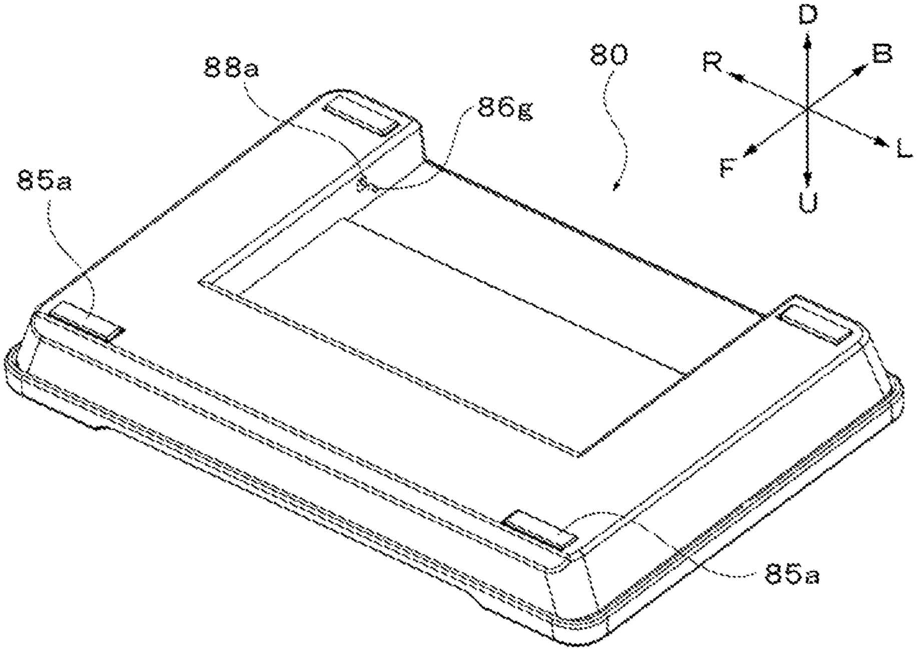

FIG. 20A is a drawing showing a perspective view of the leg portion 86. FIG. 20B is a drawing showing a perspective view of the operation unit 80 with the leg portion 86 being removed as viewed from the bottom surface side. The extendable protruding portion 86*g* in FIG. 20B is urged in the left direction L from the inside by a spring. When a pushing force that overcomes the urging force is generated in the right direction R, the extendable protruding portion 86*g* is accommodated within the operation unit 80. Next, the shaft 86*a* of the leg portion 86 shown in FIG. 20A is inserted into the bearing 88*a* shown in FIG. 20B, so that the leg portion 86 is attached to the operation unit 80. Then, the multiple holes 86*f* of the leg portion 86 are engaged with the extendable protruding portion 86*g* shown in FIG. 20B, and the opening/closing angle of the leg portion 86 is restricted according to the position of the holes 86*h*.

In the first embodiment, the opening/closing angle of the leg portion 86 is restricted by the leg portion 86 abutting on the protruding portion 88*b* or by the abutting portion 86*c* abutting on the restricting portion 88*c*. However, as shown in FIGS. 20A and 20B, the configuration may be adopted in which the extendable protruding portion 86*g* urged by a spring from the inside and the multiple holes 86*h* to be engaged with the protruding portion 86*g* are provided, and both of the vicinity of the bearing 88*a* and the leg portion 86 in the operation unit 80 are not deflected.

Even with the configuration described above, the same effect as in the first embodiment can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-199860, filed Dec. 9, 2021, which is hereby incorporated by reference herein in its entirety.

What is claimed is:

1. An image forming apparatus comprising:
a first casing including a top surface;
an operation unit including:
a second casing, which is movably placed on the top surface and receives operations by the user, separate from the first casing;
a supporting portion that pivots in a predetermined direction around a rotation shaft and supports the second casing in a first state where the angle between the top surface and the second casing is a first angle and in a second state where the angle between the top surface and the second casing is a second angle; and
a restricting portion that contacts the supporting portion and restricts rotation of the supporting portion in the predetermined direction while the supporting portion is in the second state,
wherein an end portion of the rotating shaft in the direction of an axis of the rotation shaft is elastically deformable in the direction of the axis of rotation shaft, and
wherein in a state where the end portion of the rotation shaft is elastically deformed in the direction of the axis of rotation shaft, the contact between the supporting portion and the restricting portion is released, and the restriction of rotation of the supporting portion in the predetermined direction is released.

2. The image forming apparatus according to claim 1, wherein the operation unit is connected to the first casing by a cable.

3. The image forming apparatus according to claim 1, wherein the end portion of the rotation shaft is elastically deformable in the direction from an end of the rotation shaft toward a center in the direction of the axis of rotation shaft.

4. The image forming apparatus according to claim 1, wherein:
both ends of the rotation shaft in the direction of the axis of rotation shaft are elastically deformable in the direction of the axis of rotation shaft,
in a state where both ends of said rotary shaft are elastically deformed in the direction of the axis of rotation shaft, the contact between the supporting portion and the restricting portion is released, and the regulation of the rotation of the supporting portion in the predetermined direction is released.

5. The image forming apparatus according to claim 1, wherein:
the second state is where the supporting portion is rotated in the predetermined direction from the first state,
in a state where the end of the rotation shaft is elastically deformed in the direction of the axis of rotation shaft and the contact between the supporting portion and the restricting portion is released, the supporting portion is in a third state where the supporting portion is further rotated in the predetermined direction from the second state.

6. The image forming apparatus according to claim 1, wherein while the supporting portion in the first state, the supporting portion is not in contact with the restricting portion.

7. The image forming apparatus according to claim 1, wherein:

the operating portion further includes a display portion that displays an image, while the supporting portion is in the first state, the display portion and the top surface are at a third angle, and while the supporting portion is in the second state, the display portion and the top surface are at a fourth angle.

* * * * *